(12) United States Patent
Kosuda

(10) Patent No.: US 7,363,274 B2
(45) Date of Patent: Apr. 22, 2008

(54) AUTOMATIC TELLER MACHINE

(75) Inventor: Hiroyuki Kosuda, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 09/897,099

(22) Filed: Jul. 3, 2001

(65) Prior Publication Data
US 2001/0051923 A1 Dec. 13, 2001

Related U.S. Application Data

(63) Continuation of application No. PCT/JP99/02307, filed on Apr. 30, 1999.

(51) Int. Cl.
*G06Q 40/00* (2006.01)

(52) U.S. Cl. .................. 705/44; 705/45; 235/379

(58) Field of Classification Search ............ 705/35–45; 235/379
See application file for complete search history.

(56) References Cited

U.S. PATENT DOCUMENTS

| 5,010,238 A | 4/1991 | Kadono et al. |
| 5,530,232 A | 6/1996 | Taylor |
| 5,859,419 A | 1/1999 | Wynn |

FOREIGN PATENT DOCUMENTS

| EP | 0157416 | 10/1985 |
| FR | 2 7454 06 | 8/1997 |
| JP | 60-209871 | 10/1985 |
| JP | 5-38986 | 6/1993 |
| JP | HEI 7-28918 A | 1/1995 |
| JP | HEI 7-085189 A | 3/1995 |
| JP | 8-007157 | 1/1996 |
| JP | HEI 10-188084 A | 7/1998 |
| WO | 90/15382 | 12/1990 |
| WO | 98/25241 | 6/1998 |

OTHER PUBLICATIONS

Retail Delivery Systems News, Investing in Terminals A must for the Future. 1996.*
English Abstract for Japanese Patent Publication No. 4-276858, Oct. 1, 1992.

(Continued)

*Primary Examiner*—R. C. Weisberger
(74) *Attorney, Agent, or Firm*—Staas & Halsey LLP

(57) ABSTRACT

Includes the same-financial-institution account register control section (101A) and the other-financial-institution account register control section (101B) that make the display section (103) display a screen for enabling a customer to input information of a plurality of accounts to be registered into the magnetic card (700) or the IC card (800). The account delete control section (101C) makes the display section (103) display a delete screen for enabling the customer to input account information to be deleted from the information of the plurality of accounts. The same-financial-institution account register control section (101A) and the other-financial-institution account register control section (101B) control each section so that the information of the plurality of accounts to be registered input by the customer is registered into the magnetic card (700) or the IC card (800). The account delete control section (101C) controls each section so that account information to be deleted input by the customer is deleted from the magnetic card (700) or the IC card (800).

15 Claims, 17 Drawing Sheets

A DIAGRAM SHOWING A SYSTEM STRUCTURE OF AN AUTOMATIC
TELLER MACHINE ACCORDING TO ONE EMBODIMENT

OTHER PUBLICATIONS

English Abstract for Japanese Patent Publication No. 8-180246, Jul. 12, 1996.

English Abstract for Japanese Patent Publication No. 4-205054, Jul. 27, 1992.

English Abstract for Japanese Patent Publication No. 7-028918, Jan. 31, 1995.

ICMA, "Standard Register Announces Results of National Consumer Survey of Plastic Card Usage", Sep. 1999, pp. 1-3.

Smart Card Alliance, "Smart Cards and the Retail Payments Infrastructure: Status, Drivers, and Directions", Oct. 2002, pp. 1-31.

Datacard Group, "The Transition to Multi-application Smart Cards with Post Issuance Personalization Capabilities", Version 1.0, May 2001, pp. 1-16.

Japanese Patent Office Action mailed Nov. 21, 2006, and issued in corresponding Japanese Patent Application No. 2000-615981.

* cited by examiner

A DIAGRAM SHOWING A SYSTEM STRUCTURE OF AN AUTOMATIC TELLER MACHINE ACCORDING TO ONE EMBODIMENT

A BLOCK DIAGRAM SHOWING A STRUCTURE OF THE AUTOMATIC
TELLER MACHINE ACCORDING TO ONE EMBODIMENT

A DIAGRAM SHOWING A DATA STRUCTURE OF THE MAGNETIC CARD 700

A DIAGRAM SHOWING A DATA STRUCTURE OF THE IC CARD 800

A DIAGRAM SHOWING A DATA STRUCTURE OF THE CUSTOMER INFORMATION DATABASE DB

A FLOWCHART FOR EXPLAINING THE OPERATION OF THE AUTOMATIC TELLER MACHINE ACCORDING TO ONE EMBODIMENT

A DIAGRAM SHOWING A "REGISTRATION METHOD SELECTION" SCREEN B IN THE AUTOMATIC TELLER MACHINE ACCORDING TO ONE EMBODIMENT

A DIAGRAM SHOWING A "REGISTRATION METHOD SELECTION" SCREEN B IN THE AUTOMATIC TELLER MACHINE ACCORDING TO ONE EMBODIMENT

A DIAGRAM SHOWING A "SAME FINANCIAL INSTITUTION ACCOUNT INFORMATION INPUT" SCREEN D IN THE AUTOMATIC TELLER MACHINE ACCORDING TO ONE EMBODIMENT

A DIAGRAM SHOWING AN "OTHER FINANCIAL INSTITUTION ACCOUNT INFORMATION INPUT" SCREEN E IN THE AUTOMATIC TELLER MACHINE ACCORDING TO ONE EMBODIMENT

A DIAGRAM SHOWING A "REGISTERED LIST OF TRANSACTABLE ACCOUNTS" SCREEN F IN THE AUTOMATIC TELLER MACHINE ACCORDING TO ONE EMBODIMENT

A DIAGRAM SHOWING A "CODE NUMBER FOR A PLURALITY OF ACCOUNTS REGISTRATION MENU" SCREEN G IN THE AUTOMATIC TELLER MACHINE ACCORDING TO ONE EMBODIMENT

A DIAGRAM SHOWING A "CODE NUMBER FOR A PLURALITY OF ACCOUNTS INPUT" SCREEN H IN THE AUTOMATIC TELLER MACHINE ACCORDING TO ONE EMBODIMENT

A DIAGRAM SHOWING A "TRANSACTION INITIAL" SCREEN A IN THE AUTOMATIC TELLER MACHINE ACCORDING TO ONE EMBODIMENT

FIG.16
A DIAGRAM SHOWING AN "ACCOUNT DELETE" SCREEN I IN THE AUTOMATIC TELLER MACHINE ACCORDING TO ONE EMBODIMENT

REGISTERED LIST OF TRANSACTABLE ACCOUNTS

| No | FINANCIAL INSTITUTION NAME | BRANCH NAME | TYPE OF ACCOUNT | ACCOUNT NUMBER | HOLDER NAME | REMARKS |
|---|---|---|---|---|---|---|
| 1 | XXXXXX BANK | 1234 | ORDINARY | 12345678 | FUJITSU TARO | MASTER ACCOUNT |
| 2 | XXXXXX BANK | 4567 | CURRENT | 87654321 | FUJITSU TARO | |

DELETE NO : 2
(HOWEVER, THE MASTER ACCOUNT CANNOT BE DELETED)

CODE NUMBER : X X X X

INPUT BUTTON
1 2 3 4 5 6 7 8 9 0

CONFIRM   CANCEL

A DIAGRAM SHOWING AN "ACCOUNT DELETE CONFIRMATION" SCREEN J IN THE AUTOMATIC TELLER MACHINE ACCORDING TO ONE EMBODIMENT

AUTOMATIC TELLER MACHINE

This application is a continuing application, filed under 35 U.S.C. §111(a), of International Application PCT/JP99/02307, filed Apr. 30, 1999.

TECHNICAL FIELD

The present invention relates to an automatic teller machine that enables a customer to carry out transactions with a plurality of accounts using one cash card. More particularly, this invention relates to an automatic teller machine that enables register of new accounts or deletion of non-required accounts.

BACKGROUND ART

Recently, integration of financial institutions has been progressed rapidly. Along this integration, it has become increasing important to improve the quality of services to customers at these financial institutions. Based on this background, financial institutions are trying to improve the convenience of cash cards used by customers.

At present, there is a case that the same customer opens a plurality of accounts at financial institutions like banks and adaptively uses these accounts according to the application. In this case, the customer always carries a plurality of cash cards that correspond to the respective accounts, and adaptively uses the plurality of cash cards depending on the accounts. The customer inserts a corresponding cash card into an automatic teller machine installed at each financial institution, thereby to carry out transactions like depositing, withdrawing and payment.

Conventionally, a customer having a plurality of accounts must always carry cash cards corresponding to these accounts. In the case of carrying out transactions relating to a plurality of accounts at one time, the customer must select a corresponding cash card from the plurality of cash cards and carry out transactions using this cash card, and then repeat the same series of operation by a plurality of times. Thus, this method has had a problem of lack in convenience.

In order to solve this problem, Japanese Patent Application Laid-Open No. 7-28918 discloses a technique of carrying out transactions at financial institutions using one magnetic card (cash card) in which information on a plurality of accounts has been registered. However, according to the technique disclosed in this publication, the transactions using this card are limited to a plurality of accounts of which information has been registered into one magnetic card in advance. Therefore, it is not possible to flexibly register/delete the information of the plurality of accounts based on the operation of the customer.

Consequently, the technique disclosed in this publication does not realize the further convenience that it is possible to register information of a plurality of accounts and delete the registered information of a plurality of accounts based on the free will of the customer.

The present invention has been made from the above viewpoint, and it is an object of the present invention to provide an automatic teller machine that can increase the convenience by enabling a customer to register/delete information of a plurality of accounts into/from one cash card.

DISCLOSURE OF THE INVENTION

In order to achieve the above object, the present invention provides an automatic teller machine which comprises a display control unit (corresponding to a transaction operation control section 101 and a same-financial-institution account register control section 101A in one embodiment to be described later) that makes a display unit display a menu screen for enabling a customer to input information of a plurality of accounts to be registered into a cash card; a register control unit (corresponding to the same-financial-institution account register control section 101A in one embodiment to be described later) that registers the information of the plurality of accounts input by the customer, into one cash card; and a transaction unit (corresponding to the transaction operation control section 101 in one embodiment to be described later) that carries out transactions at a financial institution based on the information of the plurality of accounts registered in the cash card.

According to the present invention, when a customer has input information of a plurality of accounts to be registered from the menu screen, the register control unit registers the information of the plurality of accounts into one cash card. Then, the customer carries out transactions relating to the plurality of accounts via the transaction unit using the registered one cash card.

As explained above, according to the present invention, the customer can register information of a plurality of accounts to be registered into one cash card, so that the convenience improves.

Further, the present invention provides an automatic teller machine that comprises a display control unit (corresponding to a transaction operation control section 101 and an other-financial-institution account register control section 101B in one embodiment to be described later) that makes a display unit display a menu screen for enabling a customer to input information of a plurality of accounts at a plurality of financial institutions respectively to be registered into a cash card; a register control unit (corresponding to the other-financial-institution account register control section 101B in one embodiment to be described later) that registers the information of the plurality of accounts at the plurality of financial institutions input by the customer, into one cash card; and a transaction unit (corresponding to the transaction operation control section 101 in one embodiment to be described later) that carries out transactions at the plurality of financial institutions based on the information of the plurality of accounts registered in the cash card.

According to the present invention, when a customer has input information of a plurality of accounts at a plurality of financial institutions to be registered from the menu screen, the register control unit registers the information of the plurality of accounts at the plurality of financial institutions into one cash card. Then, the customer carries out transactions relating to the plurality of accounts at the plurality of financial institutions via the transaction unit using the registered one cash card.

As explained above, according to the present invention, the customer can register information of a plurality of accounts at not only the same financial institution but also other financial institutions into one cash card. Therefore, the convenience improves further, and the quality of services to customers also improves.

Further, the automatic teller machine of the above aspect further comprises a delete control unit (corresponding to an account delete control section 101C in one embodiment to be described later) that makes the display unit display a menu screen for enabling a customer to input account information to be deleted from the information of the plurality of accounts that has been registered in the cash card, and deletes the account information to be deleted that has been input by the customer, from the cash card.

According to the present invention, when the customer has input account information to be deleted from the menu screen, the delete control unit deletes the account information assigned by the customer from among information of a plurality of accounts registered in one cash card. As explained above, according to the present invention, the provision of the delete control unit enables the customer to carry out deletion as well as registration of account information. Therefore, the convenience improves further.

Further, the automatic teller machine of the above aspect further comprises a storage unit (corresponding to a storage 300 in one embodiment to be described later), wherein when it is not possible to register all the information of the plurality of accounts into the cash card, the register control unit registers the account information that cannot be registered into the cash card, into the storage unit.

According to the present invention, when it is not possible to register all the information of the plurality of accounts into the cash card, the register control unit registers the account information that cannot be registered into the cash card, into the storage unit. Therefore, even when there is a very large amount of account information to be registered, the convenience of registering into one cash card is not lost.

Further, the automatic teller machine of the above aspect further comprises a delete control unit (corresponding to the account delete control section 101C in one embodiment to be described later) that makes the display unit display a menu screen for enabling a customer to input account information to be deleted from the information of the plurality of accounts that has been registered in the cash card or the storage unit, and deletes the account information to be deleted that has been input by the customer, from the cash card or the storage unit.

According to the present invention, when the customer has input account information to be deleted from the menu screen, the delete control unit deletes the account information assigned by the customer from among information of a plurality of accounts registered in the cash card or the storage unit. As explained above, according to the present invention, the provision of the delete control unit enables the customer to carry out deletion of account information. Therefore, the convenience improves.

Further, the automatic teller machine of the above aspect further comprises a code number register unit (corresponding to the same-financial-institution account register control section 101A and the other-financial-institution account register control section 101B in one embodiment to be described later) that registers a code number for a plurality of accounts that is common to the information of the plurality of accounts, into the cash card, wherein the transaction unit carries out the transactions only when the code number for a plurality of accounts coincides with a code number input by the customer as a result of a collation at the time of carrying out the transactions.

According to the present invention, the transaction unit collates a code number input by the customer with the code number for a plurality of accounts in a status that the code number register unit has registered the code number for a plurality of accounts common to the information of the plurality of accounts. The transaction unit carries out the transactions only when the code number for a plurality of accounts coincides with the code number input by the customer as a result of the collation. According to the present invention, a code number for a plurality of accounts common to information of a plurality of accounts is registered, and transactions are carried out based on this code number for a plurality of accounts. Therefore, the security improves.

Further, the present invention provides an automatic teller machine that carries out transactions at a financial institution based on information of a plurality of accounts registered in a cash card, the automatic teller machine comprising delete control unit (corresponding to the account delete control section 101C in one embodiment to be described later) that makes display unit display a menu screen for enabling a customer to input account information to be deleted from the information of the plurality of accounts that has been registered in the cash card, and deletes the account information to be deleted that has been input by the customer, from the cash card.

According to the present invention, when the customer has input account information to be deleted from the menu screen, the delete control unit deletes the account information assigned by the customer from among information of a plurality of accounts registered in the cash card. As explained above, according to the present invention, the provision of the delete control unit enables the customer to delete account information. Therefore, the convenience improves.

BRIEF DESCRIPTION OF THE DRAWINGS

FIG. 16 is a diagram showing an "account delete" screen I in the automatic teller machine according to one embodiment.

BEST MODE FOR CARRYING OUT THE INVENTION

One embodiment of an automatic teller machine relating to the present invention will be explained below with reference to the accompanying drawings.

Figure 1:
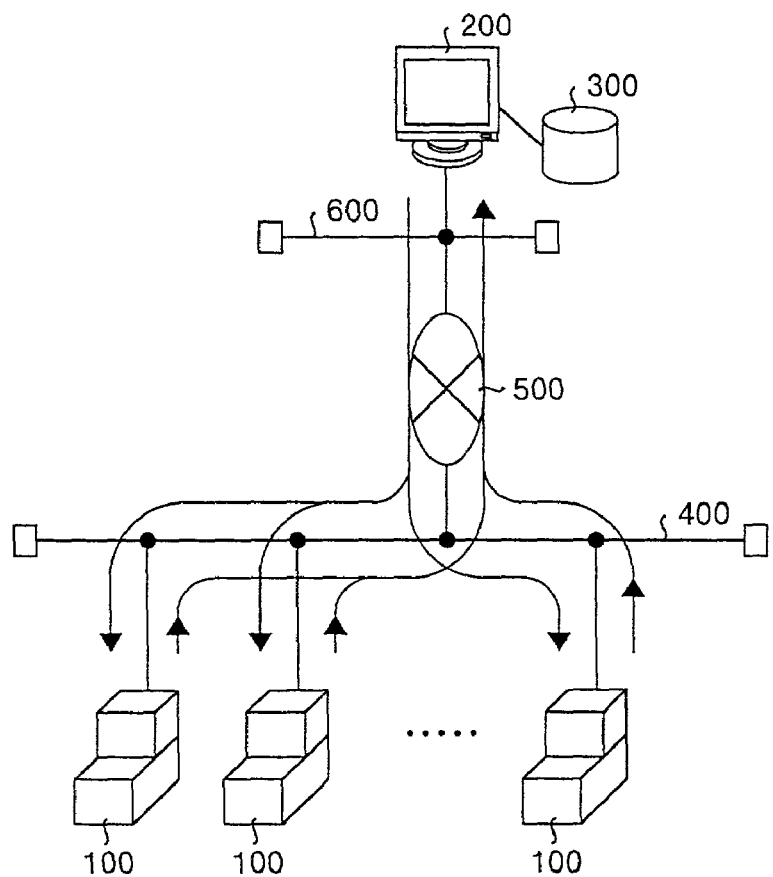
FIG. 1 is a diagram showing a system structure of an automatic teller machine according to one embodiment of the present invention.

FIG. 1 is a diagram showing a system structure of an automatic teller machine according to one embodiment of the present invention. In this drawing, 100, 100, . . . denote automatic teller machines installed within one financial institution (for example, a bank). These are devices for automatically carrying out transactions of depositing, withdrawing, payment, enquiry of balance, etc. through a cash card (a magnetic card or an IC (Integrated Circuit) card), or a bankbook. Each of these automatic teller machines 100, 100, . . . has an account register function for registering a plurality of accounts at one financial institution (or other financial institutions) into one cash card, and an account delete function for deleting a plurality of registered accounts. Details of the account register function and the account delete function will be described later.

A LAN (Local Area Network) 400 is installed within one financial institution, for connecting between a plurality of automatic teller machines 100, 100, . . . At other financial institutions, a plurality of automatic teller machines (not shown) having the same structure as that of the above automatic teller machines 100, 100, . . . are also connected with each other via a LAN (not shown). A WAN (Wide Area Network) 500 is a network consisting of a high-speed digital line, an exclusive line, etc., and this WAN connects between the LAN 400 (the LANs installed at other financial institutions (not shown)) installed within one financial institution and a LAN 600 installed in a calculation center. As explained above, FIG. 1 shows a network structure having a connection of the LAN-WAN-LAN consisting of the LAN 400, the WAN 500, and the LAN 600.

The calculation center is a place for managing customer information at a plurality of financial institutions via the network having the LAN-WAN-LAN connection. In this calculation center, a host terminal 200 is a terminal that is accessed by the automatic teller machines 100, 100, 100, . . . via the LAN 600, the WAN 500, and the LAN 400. The host terminal 200 integrally manages the customer information relating to account numbers, types of accounts, names, balances, etc. at a plurality of financial institutions. This customer information is stored in the storage 300 as a customer information database DB (refer to FIG. 2). The host terminal 200 integrally manages the customer information by referring to the customer information database DB.

Figure 2:
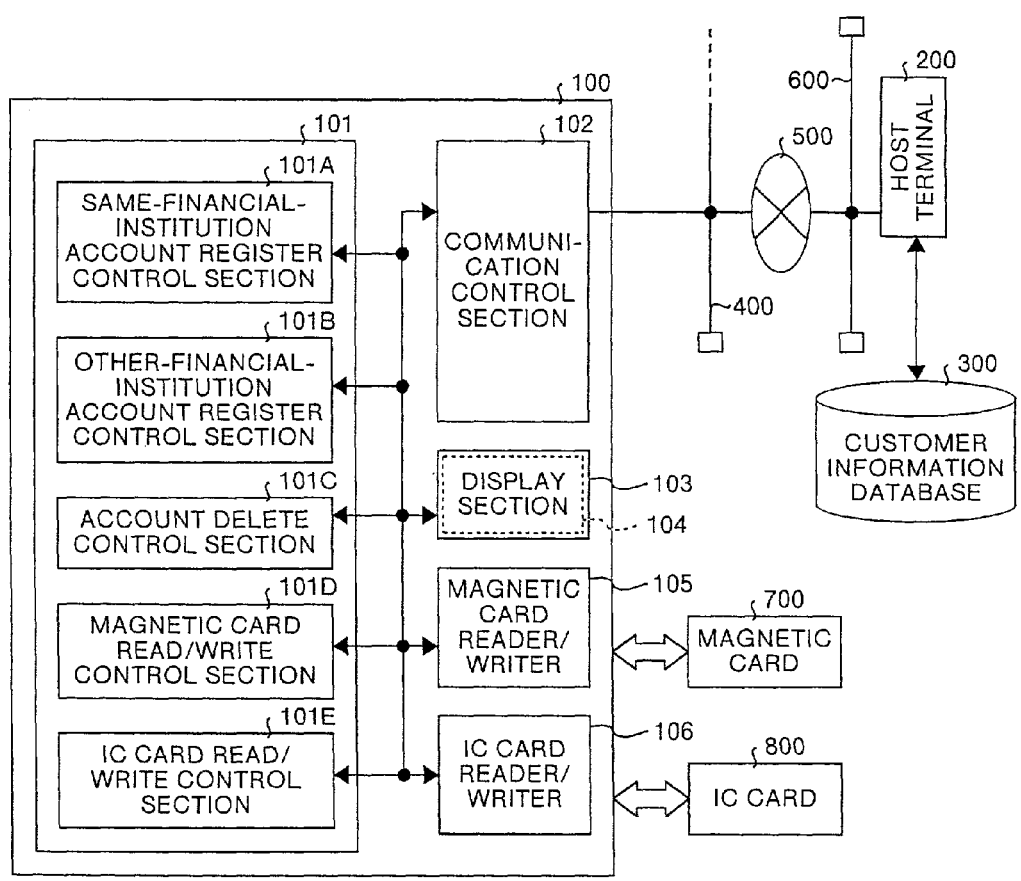
FIG. 2 is a block diagram showing a structure of the automatic teller machine according to one embodiment.

The structure of the automatic teller machine 100 will be explained in detail with reference to FIG. 2. In FIG. 2, portions corresponding to those in FIG. 1 are attached with the same reference numbers. In FIG. 2, one automatic teller machine 100 is shown out of a plurality of automatic teller machines 100, 100, . . . The automatic teller machine 100 shown in FIG. 2 consists of a transaction operation control section 101, a communication control section 102, a display section 103, a touch panel 104, a magnetic card reader/writer 105, and an IC card reader/writer 106.

Figure 3:
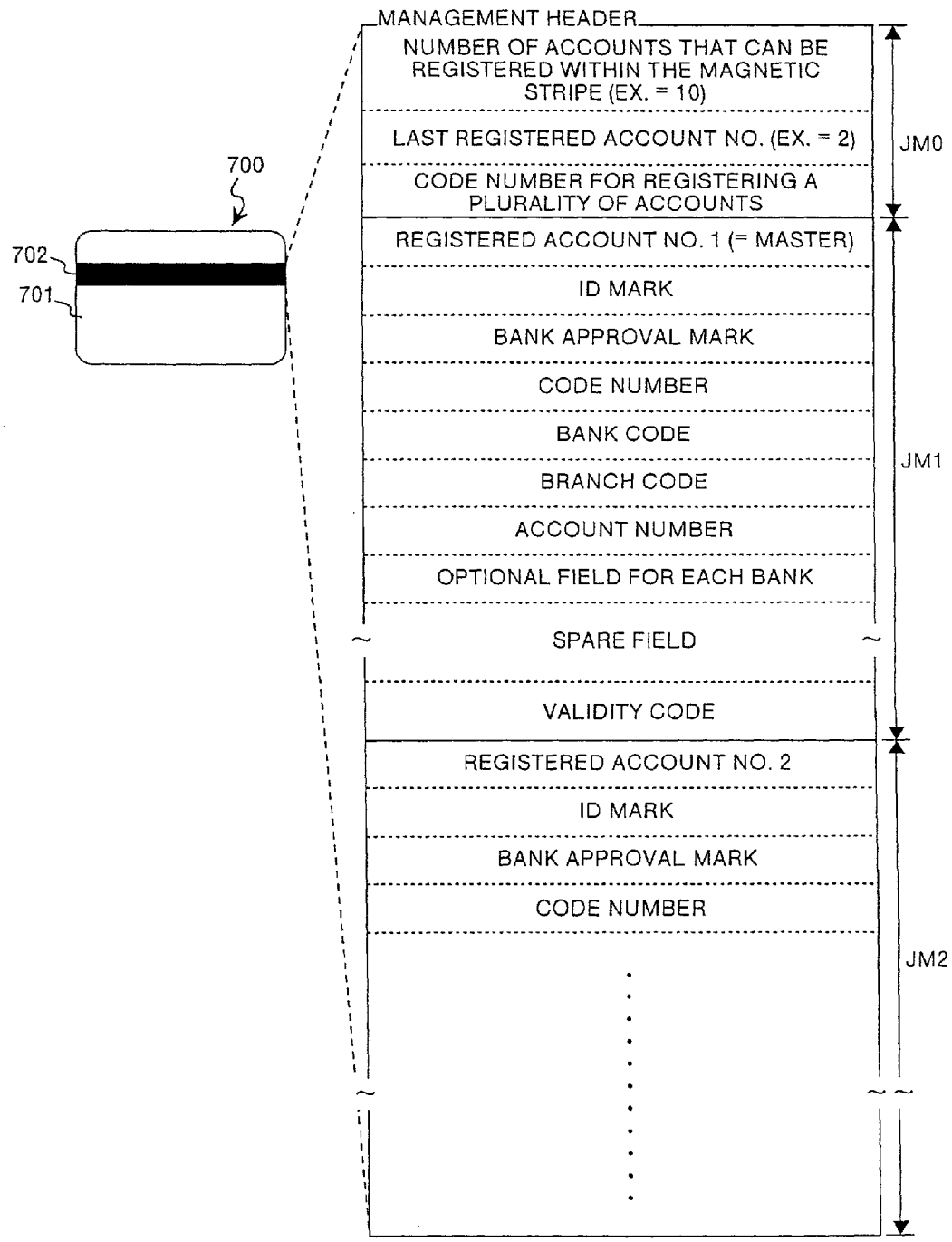
FIG. 3 is a diagram showing a data structure of a magnetic card.

In the automatic teller machine 100, a magnetic card 700 or an IC card 800 is used as a cash card. As shown in FIG. 3, this magnetic card 700 is provided having a magnetic stripe 702 formed as a magnetic recording section on a plastic card substrate 701 that is formed in sizes of 54 mm as length, 86 mm as width, and 0.76 mm as thickness. On this magnetic stripe 702, information of a plurality of accounts can be recorded such as master account information JM1, account information JM2, . . . in addition to management header information JM0. In other words, the magnetic card 700 is a recording medium recorded with information of a plurality of accounts. The information of the plurality of accounts includes account information relating to accounts opened at the same financial institution, and account information relating to accounts opened at other financial institutions.

The management header information JM0 is the information for managing the account information recorded on the magnetic card 700 (the magnetic stripe 702). Specifically, in the management header information JM0, the information of a "number of accounts that can be registered within the magnetic stripe" is the information that shows a number of accounts that can be recorded on the magnetic stripe 702, such as, for example, "10" accounts. This "number of accounts that can be registered within the magnetic stripe" is determined based on the recording capacity of the magnetic stripe 702. A "last registered account No." is a number of the last registered account information (for example, 2) among information of a plurality of accounts recorded on the magnetic stripe 702.

A "code number for registering a plurality of accounts" is a code number that makes it possible to carry out a transaction relating to a plurality of accounts, and that is set to the magnetic card 700. This code number is set separately from a code number that is individually set to each account. Using one magnetic card 700, it is possible to carry out transactions relating to a plurality of accounts. Therefore, the "code number for registering a plurality of accounts" is set for the purpose of increasing the security in consideration of the fact that the magnitude of damage incurred when the card is used illegally by a third person is larger than that when one card having one account is illegally used. In other words, the magnetic stripe 702 (the magnetic card 700) stores two kinds of code numbers of the code number for a plurality of accounts that is common to a plurality of accounts, and a code number individually set to each account.

The master account information JM1 is the information relating to an account (hereinafter to be referred to a master account) that is intrinsically recorded on the magnetic card 700. A "registered account No. 1" is an own number for specifying master account information among information of a plurality of accounts in the master account information JM1. An "ID (Identifier) mark" is an identifier for the master account information. A "bank approval mark" is approval information of a bank (a financial institution) that opens the master account. A "code number" is a number consisting of, for example, four digits that is set to the master account. Usually, this is the information that can be known by only the customer and the financial institution that has opened this master account.

A "bank code" is a code for specifying a bank name (a name of a financial institution), and this is a number of a plurality of digits. A "branch code" is a code for specifying a branch of the bank, and this is a number of a plurality of digits. An "account number" is a number for specifying the master account, and this is a number of a plurality of digits. An "optional field for each bank" is a field in which a financial institution can set optional information. A "spare field" is a field secured for spare. A "validity code" is a code showing validity of a transaction in the master account. The account information JM2 also consists of the same kind of information as that of the master account information JM1.

However, the account information JM2 is the information relating to accounts other than the master account. This is the information relating to an account opened at the same financial institution (the same financial institution) as that of the master account, or the account information relating to an account opened at other financial institution (other financial institution) different from the same financial institution. In other words, the magnetic stripe 702 (the magnetic card 700) is recorded with account information relating to a plurality of accounts opened at the same financial institution respectively, or is recorded with account information relating to a plurality of accounts opened at other financial institutions respectively.

Figure 4:
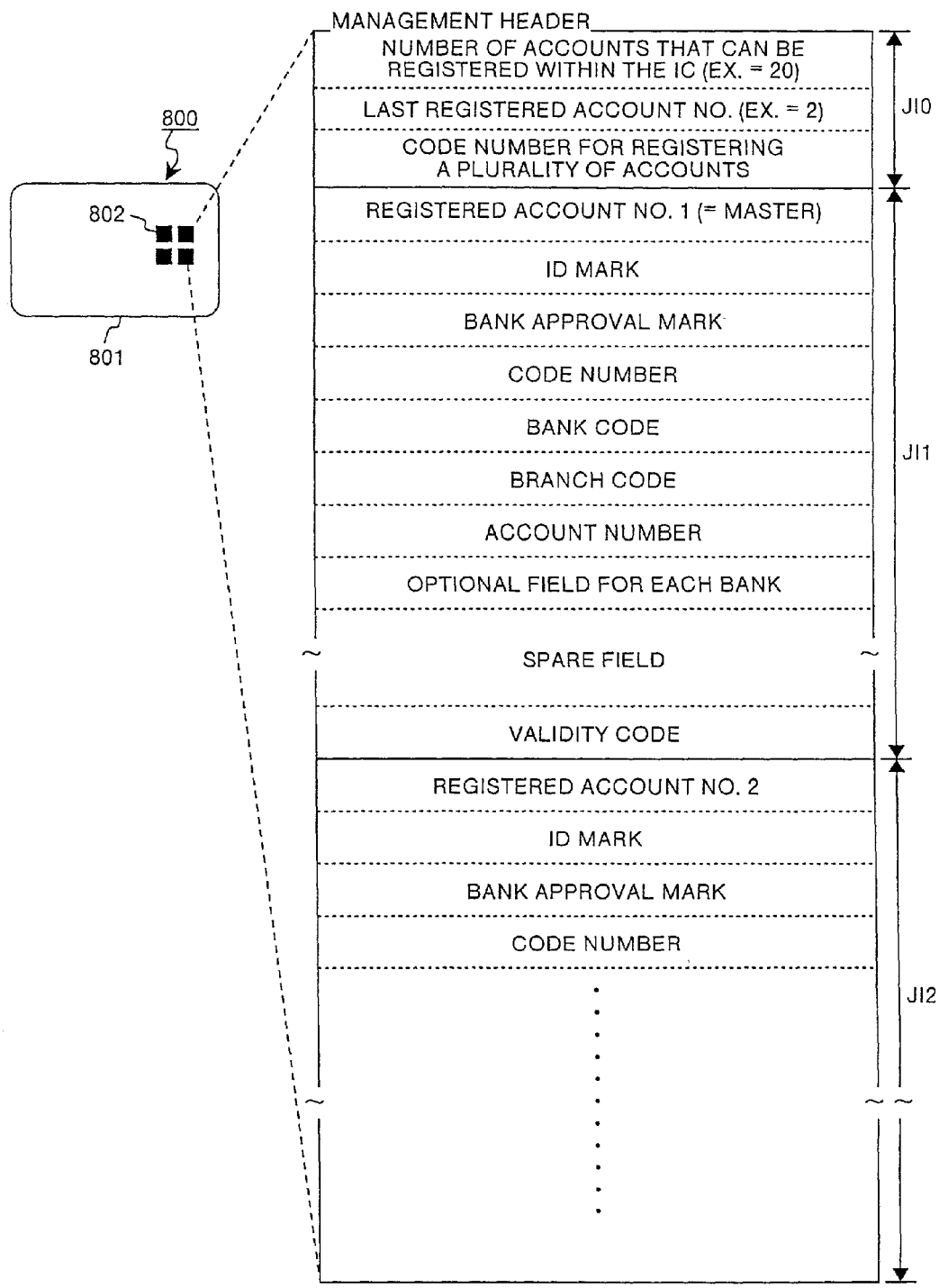
FIG. 4 is a diagram showing a data structure of an IC card.

On the other hand, the IC card 800 shown in FIG. 4 is provided having an IC 802 mounted as a recording section on a plastic card substrate 801 that is formed in sizes of 54 mm as length, 86 mm as width, and 0.2 to 3 mm as thickness. This IC card 800 is used as a cash card in a similar manner to that of the magnetic card 700. This IC 802 is a one-chip microprocessor equipped with a memory and a CPU (Central Processing Unit) for carrying out an access control to the IC card reader/writer 106 (refer to FIG. 2) and a read/write control to the memory to be described later.

On this IC 802 (the IC card 800), information of a plurality of accounts can be recorded such as master account information JI1, account information JI2, . . . in addition to management header information JI0, like the above-described magnetic stripe 702 (the magnetic card 700). In other words, the IC 802 (the IC card 800) is a recording medium recorded with information of a plurality of accounts. The data structure of the IC card 800 (the management header JI0, the master account information JI1, and the account information JI2) is the same as the data structure of the above-described magnetic card 700 (refer to FIG. 3).

In other words, the management header information JI0 shown in FIG. 4 consists of a "number of accounts that can be registered within the IC", a "last registered account No.", and a "code number for registering a plurality of accounts". This "number of accounts that can be registered within the IC" is the information showing the number of accounts of which information can be recorded on the IC 802. For example, this is "20" accounts. In this case, the "number of accounts that can be registered within the IC" (=20) is larger than the "number of accounts that can be registered within the magnetic stripe" (=10) shown in FIG. 3. This is because the recording capacity of the IC 802 is larger than the recording capacity of the magnetic stripe 702.

Like the master account information JM1 (refer to FIG. 3), the master account information JI1 shown in FIG. 4 includes information relating to the master account. This consists of a "registered account No. 1", an "ID mark", a "bank approval mark", a "code number", a "bank code", a "branch code", an "account number", an "optional field for each bank", a "spare field", and a "validity code". The account information JI2 shown in FIG. 4 also consists of information similar to the master account information JI1. However, the account information JI2 is the information relating to the accounts other than the master account.

Referring back to FIG. 2, the transaction operation control section 101 carries out the control of the account registration for registering the above-described information of a plurality of accounts into one cash card (the magnetic card 700 or the IC card 800) and the account deletion for deleting registered information of a plurality of accounts, in addition to the control relating to the basic transaction like depositing, withdrawing, payment, and enquiry of balance. Specifically, the transaction operation control section 101 consists of a same-financial-institution account register control section 101A, a other-financial-institution account register control section 101B, an account delete control section 101C, a magnetic card read/write control section 101D, and an IC card read/write control section 101E.

In the transaction operation control section 101, the same-financial-institution account register control section 101A carries out a screen display control at the time of registering information of a plurality of accounts at the same financial institution into one cash card (the magnetic card 700 or the IC card 800). The other-financial-institution account register control section 101B carries out a screen display control at the time of registering information of a plurality of accounts at other financial institutions into one cash card (the magnetic card 700 or the IC card 800). The account delete control section 101C carries out a screen display control at the time of deleting information of a single or a plurality of accounts out of information of a plurality of accounts registered in one cash card (the magnetic card 700 or the IC card 800).

The above display control is carried on the display section 103. This display section 103 is a CRT (Cathode-Ray Tube) or an LCD (Liquid Crystal Display) that displays various kinds of operation screens like a "transaction initial" screen A (refer to FIG. 7) and a "registration method selection" screen B (refer to FIG. 8) to be described later, according to a state of transaction. A customer carries out a desired transaction according to these operation screens. On the surface of the display section 103, there is adhered a touch panel 104 that functions as an electronic button (a switch) when the touch panel is depressed with a finger of the customer.

The magnetic card reader/writer 105 has a read function for reading information recorded on the magnetic card 700 (the magnetic stripe 702), and a write function for writing information onto the magnetic stripe 702. This magnetic card reader/writer 105 is provided with an insertion opening (not shown) for inserting the magnetic card 700 into it. When the magnetic card 700 has been inserted into this insertion opening, the magnetic card reader/writer 105 magnetically reads/writes information from/onto the magnetic strip 702 via a magnetic head (not shown).

Like the magnetic card reader/writer 105, the IC card reader/writer 106 also has a read function for reading information recorded on the IC card 800 (the IC 802), and a write function for writing information onto the IC 802. This IC card reader/writer 106 is equipped with a contact section (not shown) for connecting the terminal of the IC 802. When the terminal has been connected to the contact section, the IC card reader/writer 106 electrically reads/writes information from/onto the IC 802.

In the transaction operation control section 101, the magnetic card read/write control section 101D controls the read/write operation of the magnetic card reader/writer 105, and the IC card read/write control section 101E controls the read/write operation of the IC card reader/writer 106. The communication control section 102 carries out communications with the host terminal 200 via the LAN 400, the WAN 500, and the LAN 600, according to a predetermined communication protocol.

The storage 300 is connected to the host terminal 200, and stores customer information database DB. The customer information database DB will be explained in detail with reference to FIG. 5. This customer information database DB is a database of customer information (account number, type of account, name, balance, presence/absence of a plurality of accounts, etc.) relating to the account of a customer who utilizes the system structure shown in FIG. 1. This database is shared with a plurality of financial institutions.

Specifically, the customer information database DB can be recorded with information of a plurality of accounts including master account information JD1, account information JD2, . . . , in addition to "attribute information of a plurality of account transactions" JD0. In other words, the storage 300 is a recording medium for recording information of a plurality of accounts. The information of the plurality of accounts includes account information relating to accounts opened at the same financial institution, and account information relating to accounts opened at other financial institutions.

Figure 5:
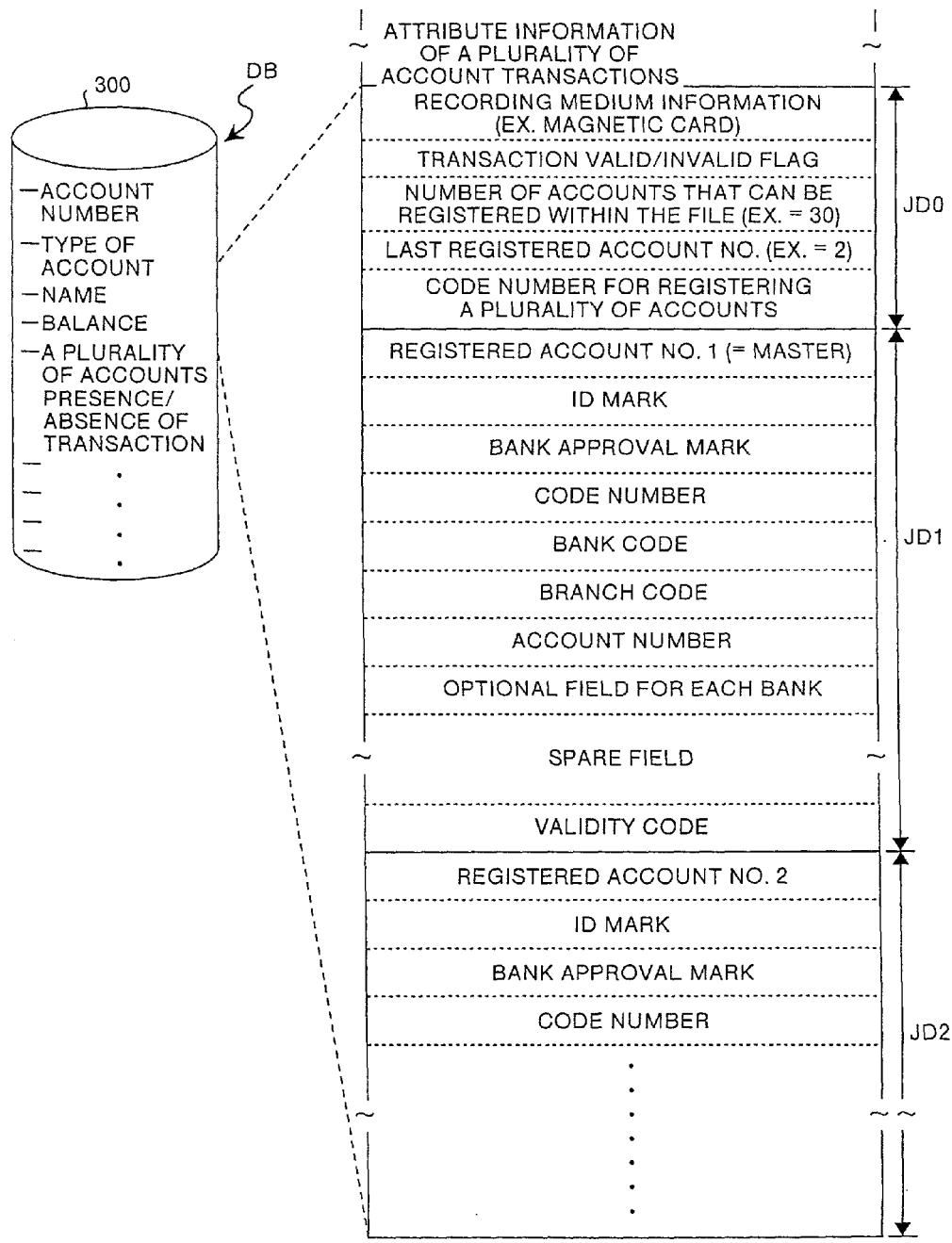
FIG. 5 is a diagram showing a data structure of a customer information database DB.

The "attribute information of a plurality of account transactions" JD0 is the information for managing the information of a plurality of account transactions. In FIG. 5, the "attribute information of a plurality of account transactions" JD0, the master account information JD1, the account information JD2, . . . relating to one customer are illustrated. However, in actual practice, the customer information database DB includes the "attribute information of a plurality of account transactions" JD0, the master account information JD1, the account information JD2, . . . relating to a plurality of customers.

In the "attribute information of a plurality of account transactions" JD0, "recording medium information" is the information showing a kind of a recording medium (a cash card) that the customer uses. Namely, in the embodiment, the magnetic card 700 or the IC card 800 is used as the cash card as described above. Therefore, the "recording medium information" is the magnetic card 700 or the IC card 800. In this drawing, the "recording medium information" is a magnetic card. A "transaction valid/invalid flag" is a flag for making valid or making invalid a transaction in the plurality of accounts. When the transaction in the plurality of accounts is made valid, a "1" flag is set. On the other hand, when the transaction in the plurality of accounts is made invalid, a "0" flag is set.

The information of a "number of accounts that can be registered within the file" is the information showing the number of accounts of which information can be recorded in one file for one customer in the customer information database DB. For example, this number is "30" accounts. A "last registered account No." is a number of the last registered account information (for example, 2) among information of a plurality of accounts registered in one file. A "code number for registering a plurality of accounts" is a code number to be set to transactions of a plurality of accounts, and this code number is set separately from a code number individually set to each account.

The master account information JD1 is the information similar to the above-described master account information JM1 (refer to FIG. 3), and this is the information relating to a master account. In other words, the master account information JD1 includes a "registered account No. 1", an "ID mark", a "bank approval mark", a "code number", a "bank code", a "branch code", an "account number", an "optional field for each bank", a "spare field", and a "validity code". The account information JD2 also consists of information similar to the master account information JD1.

However, the account information JD2 is the information relating to the accounts other than the master account. This is the information relating to an account opened at the same financial institution (the same financial institution) as that of the master account, or the account information relating to an account opened at other financial institution (other financial institution) different from the same financial institution.

The operation of the automatic teller machine in the above embodiment will be explained below with reference to a flowchart shown in FIG. 6. Among the transactions (depositing/withdrawing, payment, enquiry of balance, registration of an account, and deletion of an account) that are carried out in the automatic teller machine, the registration of an account and the deletion of an account will be mainly explained below.

Figure 6:
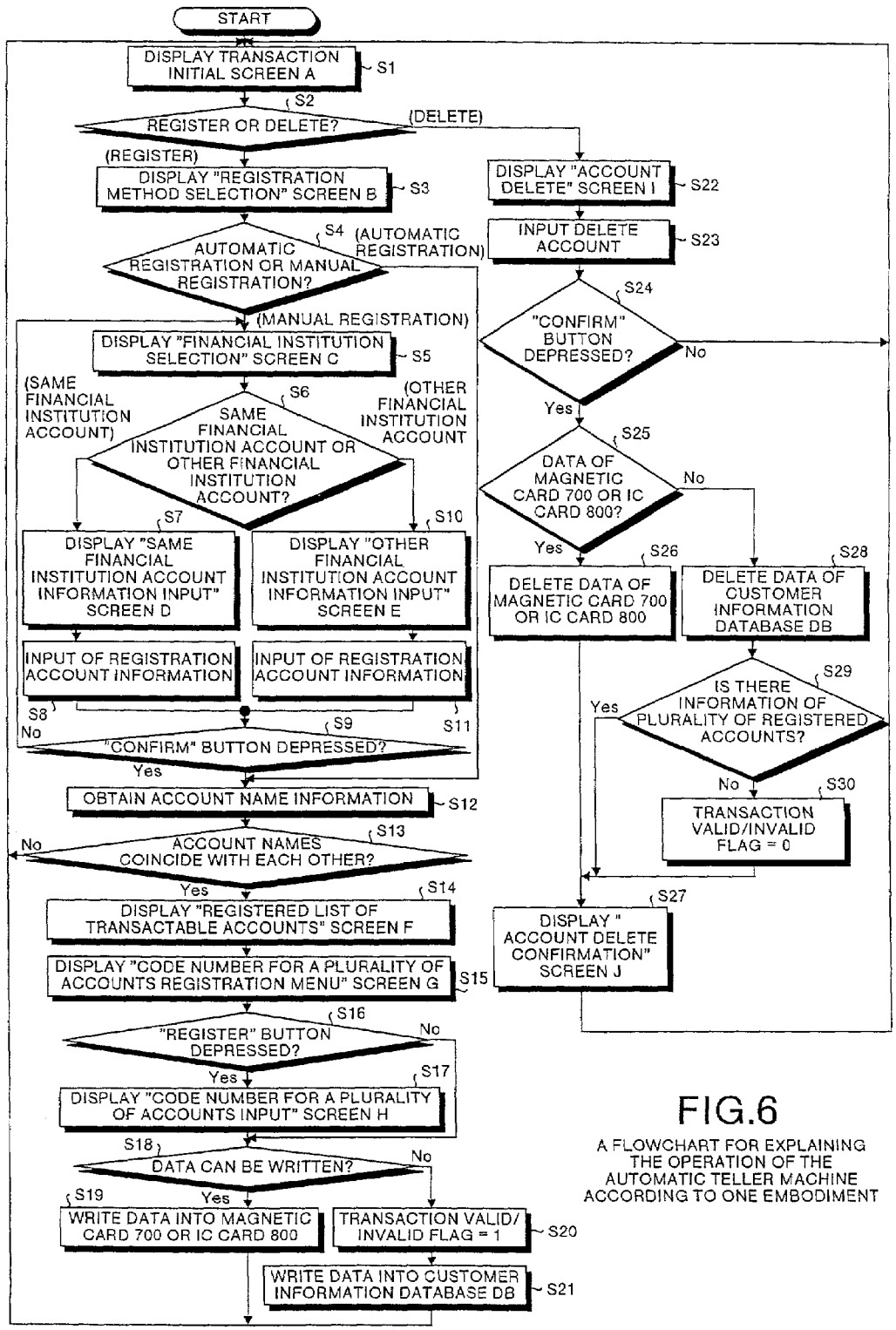
FIG. 6 is a flowchart for explaining the operation of the automatic teller machine according to one embodiment.
Figure 7:
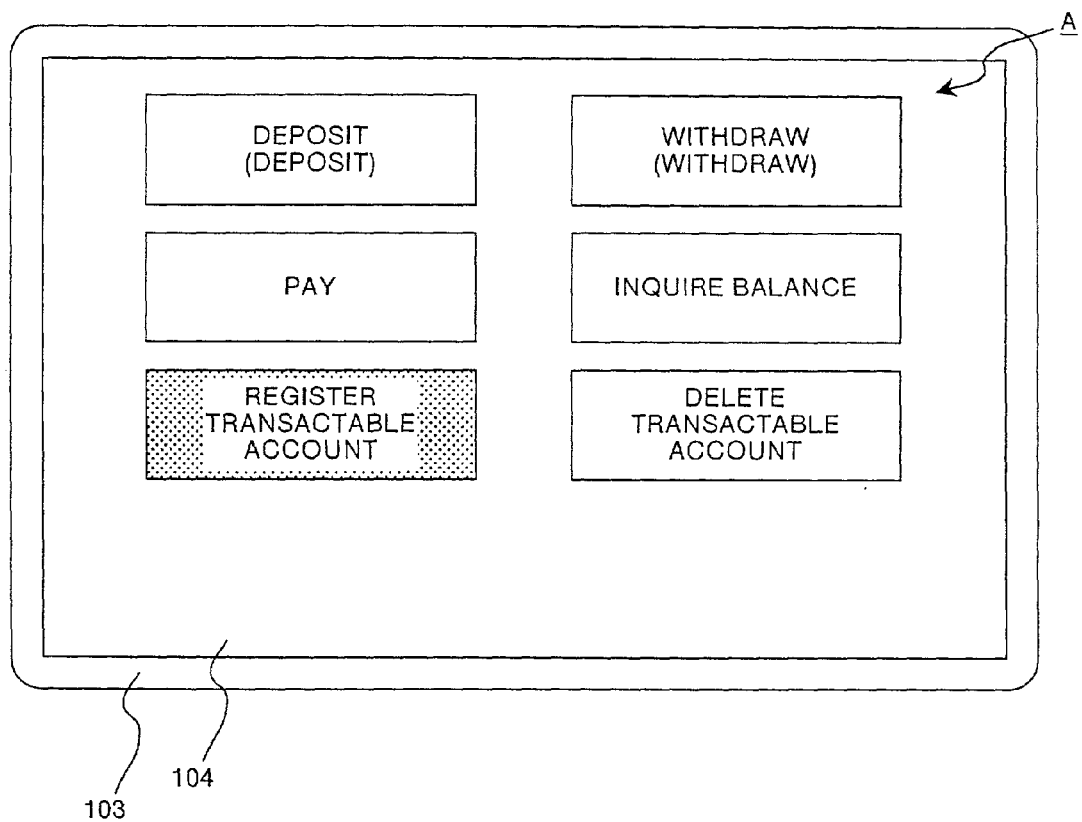
FIG. 7 is a diagram showing a "transaction initial" screen A of the automatic teller machine according to one embodiment.

When the magnetic card 700 has been inserted into the magnetic card reader/writer 105 of the automatic teller machine 100 (or when the IC card 800 has been inserted into the IC card reader/writer 106) in FIG. 2, the transaction operation control section 101 displays a "transaction initial" screen A shown in FIG. 7 on the display section 103 at step S1 shown in FIG. 6. Then, the process proceeds to step S2. The display section 103 displays menu buttons for selecting a plurality of transactions including a "deposit", a "withdraw", a "pay", an "inquire balance", a "register a transactable account", and a "delete a transactable account".

At step S2, the transaction operation control section 101 makes a decision about whether the "register a transactable account" button or the "delete a transactable account" button has been depressed on the "transaction initial" screen A. When a customer has depressed the "register a transactable account" button, the touch panel 104 detects the depressing of this button. Thus, the transaction operation control section 101 proceeds to step S3.

Figure 8:
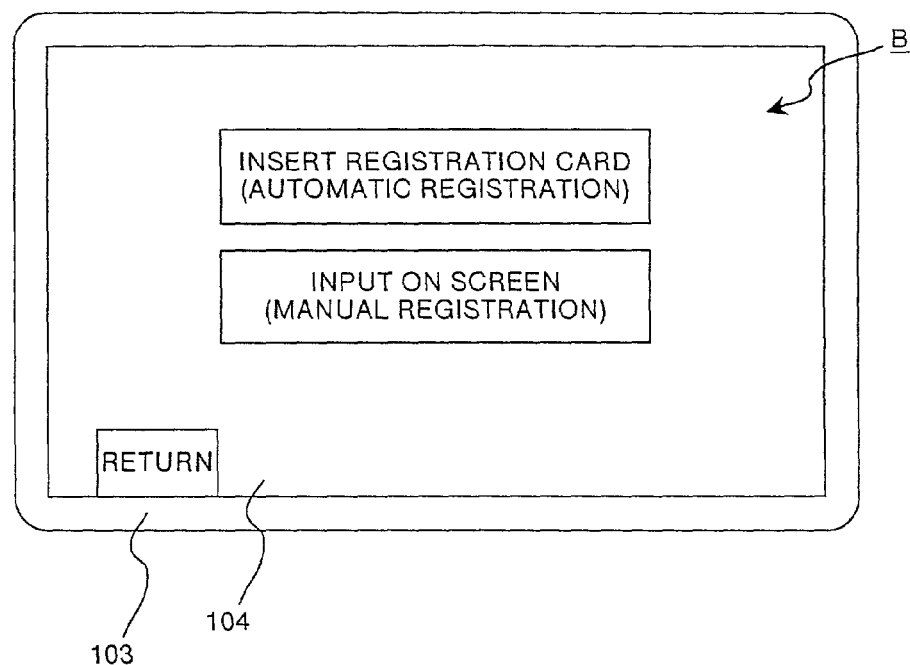
FIG. 8 is a diagram showing a "registration method selection" screen B in the automatic teller machine according to one embodiment.

At step S3, the transaction operation control section 101 displays a "registration method selection" screen B shown in FIG. 8 on the display section 103. Then, the display section 103 displays a screen for selecting either an "insert a registration card (automatic registration)" for selecting a registration of an account by automatic registration, or an "input on the screen (manual registration)" for selecting a registration of an account by manual registration. At the next step S4, the transaction operation control section 101 makes a decision about whether the "insert a registration card (automatic registration)" button or the "input on the screen (manual registration)" button has been depressed on the "registration method selection" screen B.

When the customer has depressed the "input on the screen (manual registration)" button, the touch panel 104 detects this selection, and the transaction operation control section 101 proceeds to step S5. Then, the display section 103 shows a "financial institution selection" screen C shown in FIG. 9. The display section 103 displays a screen for selecting either "accounts at the same financial institution" for selecting a registration of a plurality of accounts at the same financial institution, or "accounts at other financial institutions" for selecting a registration of a plurality of accounts at other financial institutions.

At the next step S6, the transaction operation control section 101 makes a decision about whether the "accounts at the same financial institution" button or the "accounts at other financial institutions" button has been depressed on the "financial institution selection" screen C. When the customer has depressed the "accounts at the same financial institution" button, the touch panel 104 detects this selection. At steps S7, the same-financial-institution account register control section 101A displays a "same financial institution account information input" screen D shown in FIG. 10 in the display section 103. Then, the display section 103 displays a menu consisting of a "branch number" showing a branch code of the financial institution, an "account type" for selecting a type of account of either an ordinary account or a current account, a "code number" of this account, an "input button" for ten-key input from 0 to 9, a "register", and a "return".

Figure 10:
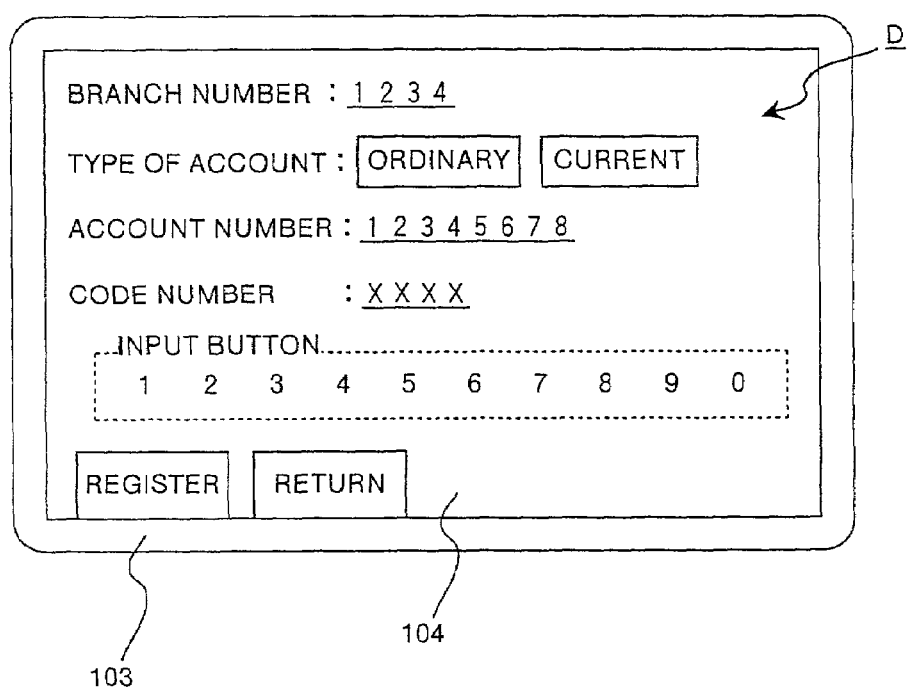
FIG. 10 is a diagram showing a "same financial institution account information input" screen D in the automatic teller machine according to one embodiment.

Then, the customer inputs information relating to the master account out of a plurality of accounts at the same financial institution for registration, using the "same financial institution account information input" screen D shown in FIG. 10. Specifically, the customer inputs "1234" as the "branch number" on the "same financial institution account information input" screen D from the "input button". Then, the customer selects the "ordinary" as the "type of account". Further, the customer inputs "12345678" as the "account number" from the "input button", and then inputs the "code number" of this account from the "input button". Then, the customer depresses the "register" button shown in FIG. 10 after the input of the information relating to the master account has been finished.

The touch panel 104 detects the depression of the button. At step S8, the same-financial-institution account register control section 101A recognizes the information (the branch number, the type of account, the account number, and the code number) relating to the input master account. Then, the process proceeds to step S9. At step S9, the same-financial-institution account register control section 101A displays a "confirm" button not shown in the display section 103, and makes a decision about whether this "confirm" button has been depressed or not.

In this case, the customer does not depress this "confirm" button as the customer wants to input information relating to an account to be registered as a second account. Accordingly, a result of the decision at step S9 is set as "No". At step S5, the transaction operation control section 101 displays the "financial institution selection" screen C shown in FIG. 9 again in the display section 103. Then, the process proceeds to step S6.

In this case, when the "accounts at the same financial institution" button has been depressed on the "financial institution selection" screen C, at step S7, the same-financial-institution account register control section 101A displays the "same financial institution account information input" screen D (refer to FIG. 10) in the display section 103. Then, the customer inputs information relating to the second account at the same financial institution, and depresses the "register" button in a similar manner to that described above.

At step S8, the same-financial-institution account register control section 101A recognizes the information (the branch number, the type of account, the account number, and the code number) relating to the input second account. Then, the process proceeds to step S9. At step S9, the same-financial-institution account register control section 101A displays the "confirm" button not shown in the display section 103, and makes a decision about whether this "confirm" button has been depressed or not.

When the customer has depressed this "confirm" button, the same-financial-institution account register control section 101A sets "Yes" as a result of the decision made at step S9, and then the process proceeds to step S12.

At step S12, the same-financial-institution account register control section 101A delivers the information of the account number relating to the first master account and the information of the account number relating to the second account input at step S7, to the communication control section 102. Then, the communication control section 102 makes access to the host terminal 200 via the LAN 400, the WAN 500, and the LAN 600, obtains the information of the account names (names) of the respective accounts from the customer information database DB, and delivers all the information to the same-financial-institution account register control section 101A.

At step S13, the same-financial-institution account register control section 101A makes a decision about whether the two account names obtained coincide with each other or not. When a result of the decision made is "No", it is not possible to register the account, and the process returns to step S1. In other words, in this case, as the account names of the plurality of accounts to be registered are different, it is not possible to register the account.

Figure 12:
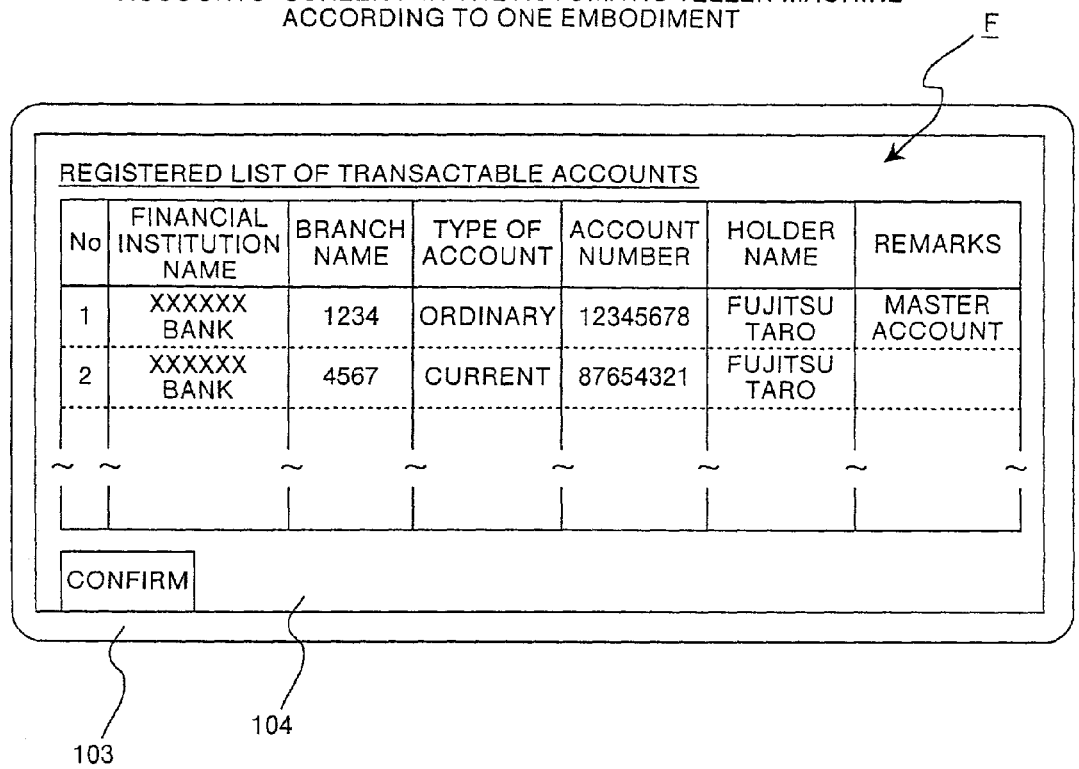
FIG. 12 is a diagram showing a "registered list of transactable accounts" screen F in the automatic teller machine according to one embodiment.

On the other hand, when a result of the decision made at step S13 is "Yes", the same-financial-institution account register control section 101A proceeds to step S14, and displays a "registered list of transactable accounts" screen F shown in FIG. 12 in the display section 103. Then, the display section 103 displays for each account the information (No. (a registered account number), a financial institution name, a branch number, a type of account, an account number, a name, and remarks) relating to a plurality of accounts. On the "registered list of transactable accounts" screen F, the account information that has the No. (the registered account number) 1 consists of information including "XXXXXX bank" as the "financial institution name", "1234" as the "branch number", "ordinary" as the "type of account", "12345678" as the "account number", "Fujitsu Taro" as the "name", and "master account" as the "remarks".

On the other hand, the account information that has the No. (the registered account number) 2 consists of information "xxxxxx bank" as the "financial institution name", "4567" as the "branch number", "current" as the "type of account", "87654321" as the "account number", and "Fujitsu Taro" as the "name".

Figure 13:
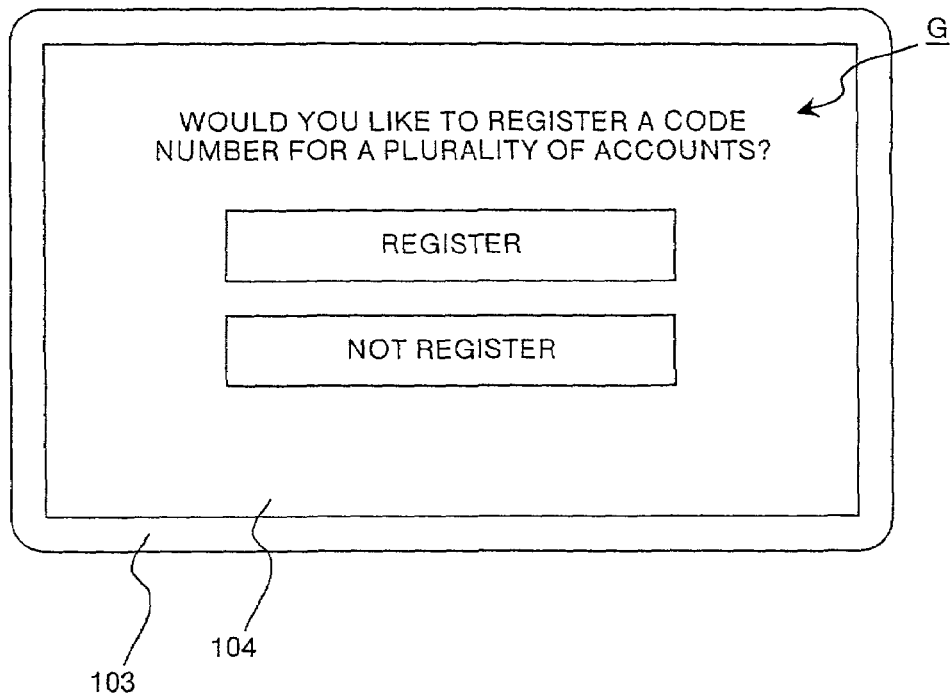
FIG. 13 is a diagram showing a "code number for a plurality of accounts registration menu" screen G in the automatic teller machine according to one embodiment.

The customer confirms the information relating to a plurality of (in this case, two) accounts to be registered at the same financial institution, based on the "registered list of transactable accounts" screen F, and then depresses the "confirm" button shown in the drawing. Then, the same-financial-institution account register control section 101A proceeds to step S15, displays the "code number for a plurality of accounts registration menu" screen G shown in FIG. 13 in the display section 103. Then, the process proceeds to step S16. In other words, the "code number for a plurality of accounts registration menu" screen G displays a "register" button and a "not register" button for selecting the registration or non-registration of the code number for a plurality of accounts.

At step S16, the same-financial-institution account register control section 101A makes a decision about whether the "register" button of the "code number for a plurality of accounts registration menu" screen G has been depressed or not. When a result of this decision is "Yes", the same-financial-institution account register control section 101A proceeds to step S17. On the other hand, when the "not register" button of the "code number for a plurality of accounts registration menu" screen G has been depressed, the same-financial-institution account register control section 101A sets "No" as a result of the decision made at step S16. Then, the process proceeds to step S18.

Figure 14:
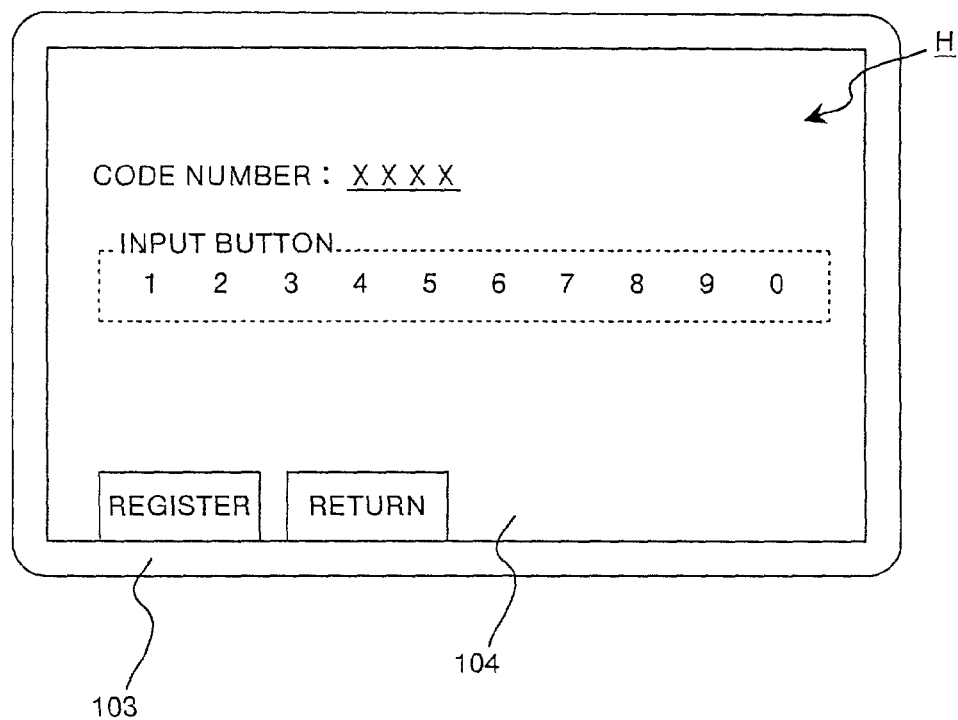
FIG. 14 is a diagram showing a "code number for a plurality of accounts input" screen H in the automatic teller machine according to one embodiment.

In this case, when the "register" button has been depressed, the same-financial-institution account register control section 101A displays the "code number for a plurality of accounts input" screen H shown in FIG. 14 in the display section 103, at step S17. Then, the display section 103 displays an input column of a "code number", input buttons (0 to 9) for inputting the code number for a plurality of accounts, a "register" button, and a "return" button respectively. Then, the customer inputs a four-digit code number from the "input button", and depresses the "register" button.

At step S18, the same-financial-institution account register control section 101A makes a decision about whether it is possible to write data relating to the information of a plurality of accounts into the magnetic card 700 (refer to FIG. 3) (or the IC card 800 (refer to FIG. 4)) or not. This decision method for the case of the magnetic card 700 and the case of the IC card 800 will be explained separately below. First, when the magnetic card 700 shown in FIG. 2 has been inserted into the magnetic card reader/writer 105, the same-financial-institution account register control section 101A issues a read instruction to the magnetic card read/write control section 101D. Then, the magnetic card read/write control section 101D controls the magnetic card reader/writer 105 to read the management header information JM0 shown in FIG. 3, and delivers this management header information JM0 to the same-financial-institution account register control section 101A.

Then, the same-financial-institution account register control section 101A subtracts the "last registered account No." from the "number of accounts that can be registered within the magnetic stripe" in the management header information JM0, thereby to obtain the number of accounts that can be registered. Next, the same-financial-institution account register control section 101A makes a decision that it is possible to write data into the magnetic card 700 when the number of accounts to be registered (two accounts in this case) is equal to or less than the number of accounts that can be registered. On the other hand, the same-financial-institution account register control section 101A makes a decision that it is not possible to write data into the magnetic card 700 when the number of accounts to be registered is larger than the number of accounts that can be registered.

Similarly, when the IC card 800 has been inserted into the IC card reader/writer 106, the same-financial-institution account register control section 101A issues a read instruction to the IC card read/write control section 101E. Then, the IC card read/write control section 101E controls the IC card reader/writer 106 to read the management header information JI0 shown in FIG. 4, and delivers this management header information JI0 to the same-financial-institution account register control section 101A.

Then, the same-financial-institution account register control section 101A subtracts the "last registered account No." from the "number of accounts that can be registered within the IC" in the management header information JI0, thereby to obtain the number of accounts that can be registered. Next, the same-financial-institution account register control section 101A makes a decision that it is possible to write data into the IC card 800 when the number of accounts to be registered (two accounts in this case) is equal to or less than the number of accounts that can be registered. On the other hand, the same-financial-institution account register control section 101A makes a decision that it is not possible to write data into the IC card 800 when the number of accounts to be registered is larger than the number of accounts that can be registered.

In this case, when the magnetic card 700 has been inserted into the magnetic card reader/writer 105, and also when the "last registered account No." in the management header information JM0 shown in FIG. 3 is 0, the same-financial-institution account register control section 101A sets "Yes" as a result of the decision made at step S18. Then, the process proceeds to step S19. At step S19, the same-financial-institution account register control section 101A delivers the information relating to the two accounts to be registered into the magnetic stripe 702 of the magnetic card 700, to the magnetic card read/write control section 101D.

Then, the magnetic card read/write control section 101D write-controls the magnetic card reader/writer 105, thereby to write each information into the management header information JM0, the master account information JM1, and the account information JM2 of the magnetic stripe 702 of the magnetic card 700. Then, the process returns to step S1. Based on this, 2 is recorded as the "last registered account No.", and the information of the code number input at step S17 is recorded as the "code number for registering a plurality of accounts", in the recording area of the management header information JM0 shown in FIG. 3. Further, the master account and the second account input at step S8 are recorded into the recording areas of the master account information JM1 and the account information JM2 respectively.

When the IC card 800 has been inserted into the IC card reader/writer 106, and also when the "last registered account No." in the management header information JI0 shown in FIG. 4 is 0, the same-financial-institution account register control section 101A sets "Yes" as a result of the decision made at step S18. Then, the process proceeds to step S19. At step S19, the same-financial-institution account register control section 101A delivers the information relating to the two accounts to be registered into the IC 802 of the IC card 800, to the IC card read/write control section 101E.

Then, the IC card read/write control section 101E write-controls the IC card reader/writer 106, thereby to write each information into the management header information JI0, the master account information JI1, and the account information JI2 of the IC 802 of the IC card 800 in a similar manner to that of the magnetic card 700. Then, the process returns to step S1.

On the other hand, when a result of the decision made at step S18 is "No", that is, when it is not possible to write data into the magnetic card 700 (the IC card 800), the same-financial-institution account register control section 101A proceeds to step S20. At step S20, the same-financial-institution account register control section 101A issues an access request to the communication control section 102 to the host terminal 200. Then, the communication control section 102 makes access to the host terminal 200 via the LAN 400, the WAN 500, and the LAN 600, and sets 1 to the "transaction valid/invalid flag" in the "attribute information of a plurality of account transactions" JD0 shown in FIG. 5. Thus, it is made possible to carry out a transaction of a plurality of accounts using the customer information database DB.

At the next step S21, the same-financial-institution account register control section 101A delivers the information relating to the two accounts to be registered into the customer information database DB, to the communication control section 102. Then, the communication control section 102 makes access to the host terminal 200, and writes each information to the "attribute information of a plurality of account transactions" JD0, the master account information JD1, and the account information JD2 shown in FIG. 5, in a similar manner to that of the magnetic card 700 and the IC card 800. Then, the process returns to step S1. Based on this, the magnetic card is recorded as the "recording medium information", 2 is recorded as the "last registered account No.", and the information of the code number input at step S17 is recorded as the "code number for registering a plurality of accounts", in the recording area of the "attribute information of a plurality of account transactions" JD0 shown in FIG. 5. Further, the information relating to the master account and the information relating to the second account input at step S8 are recorded into the recording areas of the master account information JD1 and the account information JD2 respectively.

As explained above, when the registration of the accounts at the same financial institution has been selected at step S6, the information of the plurality of accounts at the same financial institution is registered into the magnetic card 700 (the magnetic stripe 702), the IC card 800 (the IC 802), or the customer information database DB, respectively. The code number for a plurality of accounts is also registered when necessary.

Next, the registration of a plurality of accounts at other financial institutions into the magnetic card 700 (the magnetic stripe 702), the IC card 800 (the IC 802), or the customer information database DB will be explained.

Figure 9:
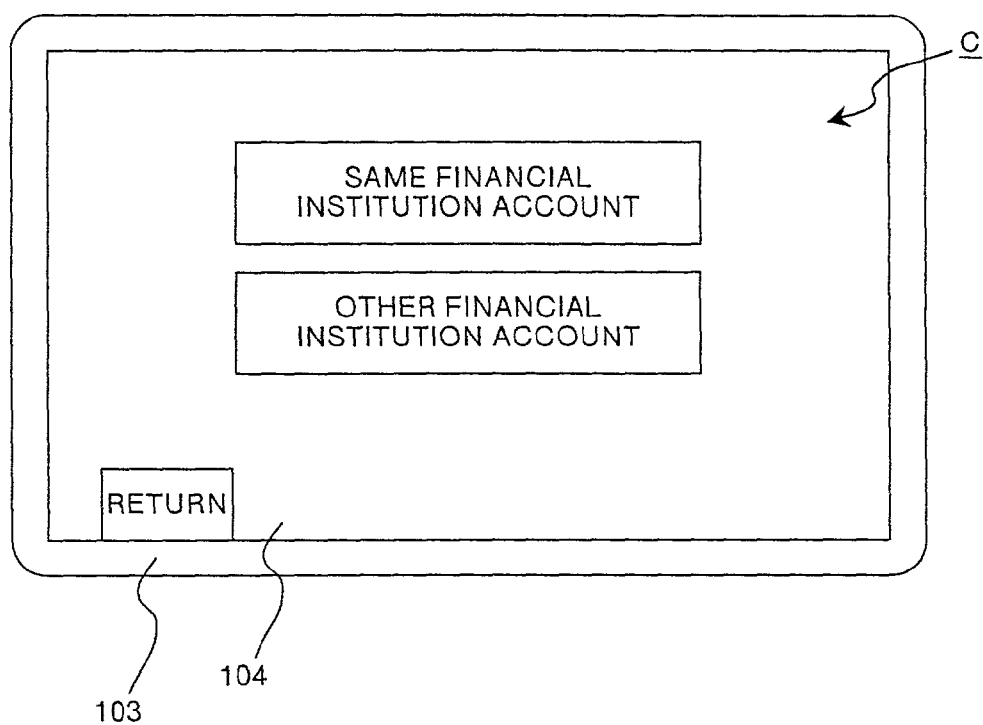
FIG. 9 is a diagram showing a "financial institution selection" screen C in the automatic teller machine according to one embodiment.

When the customer has depressed the "accounts at other financial institutions" button in the state that the "financial institution selection" screen C shown in FIG. 9 is shown in the display section 103, the touch panel 104 detects this selection. At steps S10, the other-financial-institution account register control section 101B displays an "other financial institution account information input" screen E shown in FIG. 11 in the display section 103. Then, the display section 103 displays a menu consisting of a "financial institution name" at other financial institution, a "branch number" showing a branch code of the other financial institution, an "account type" for selecting a type of account of either an ordinary account or a current account, a "code number" of this account, an "input button" for ten-key input from 0 to 9 and Kana input, a "register", and a "return".

Figure 11:
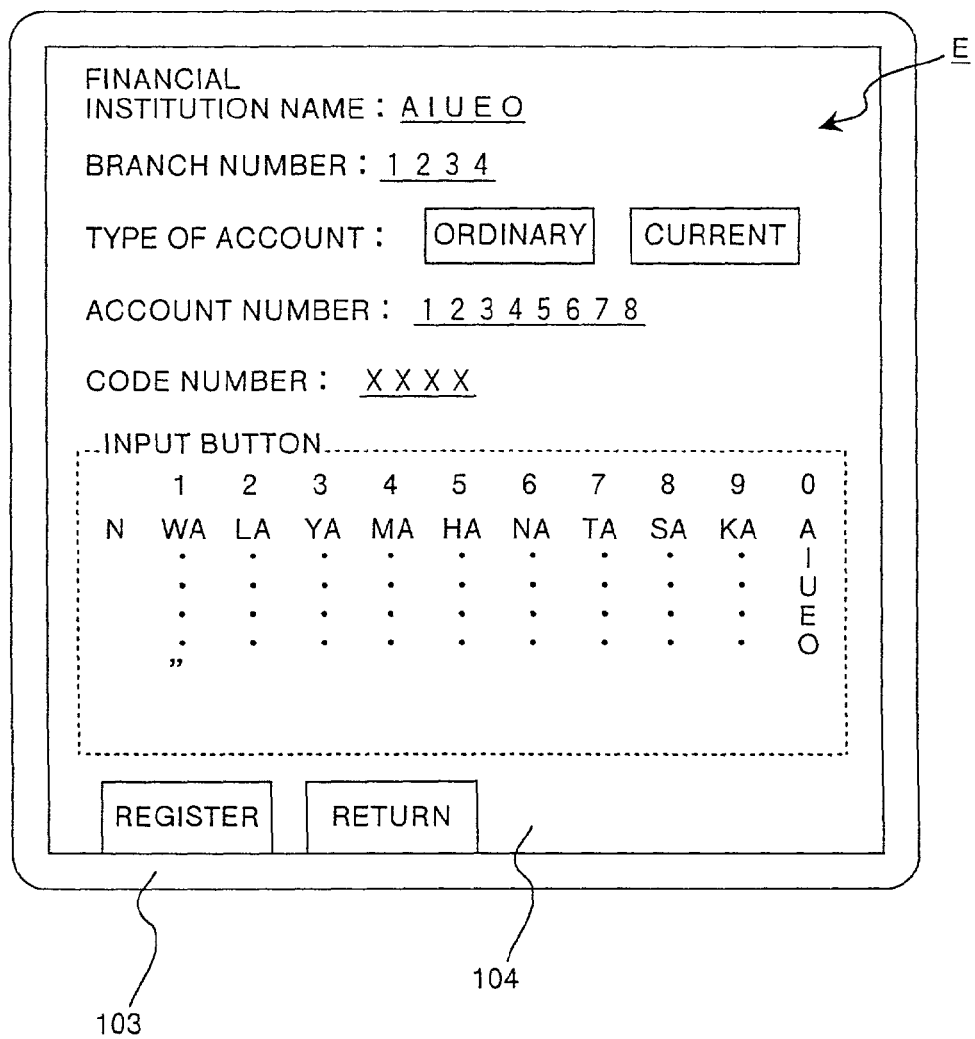
FIG. 11 is a diagram showing an "other financial institution account information input" screen E in the automatic teller machine according to one embodiment.

Then, the customer inputs information relating to the master account out of a plurality of accounts at the other financial institutions for registration, using the "other financial institution account information input" screen E shown in FIG. 11. Specifically, the customer inputs "abcde" as the "financial institution name" from the "input button", inputs "1234" as the "branch number" from the "input button", and then selects the "ordinary" as the "type of account". Further, the customer inputs "12345678" as the "account number" from the "input button", and then inputs the "code number" of this account from the "input button". Then, the customer depresses the "register" button shown in FIG. 11 after the input of the information relating to the master account has been finished.

The touch panel 104 detects the depression of the button. At step S11, the other-financial-institution account register control section 101B recognizes the information (the financial institution name, the branch number, the type of account, the account number, and the code number) relating to the input master account. Then, the process proceeds to step S9. At step S9, the other-financial-institution account register control section 101B displays the "confirm" button not shown in the display section 103, and makes a decision about whether this "confirm" button has been depressed or not.

In this case, the customer does not depress this "confirm" button as the customer wants to input information relating to an account to be registered as a second account at the other financial institution. Accordingly, a result of the decision at step S9 is set as "No". At step S5, the transaction operation control section 101 displays the "financial institution selection" screen C shown in FIG. 9 again in the display section 103. Then, the process proceeds to steps S6.

In this case, when the "accounts at other financial institutions" button has been depressed on the "financial institution selection" screen C, at step S10, the other-financial-institution account register control section 101B displays the "other financial institution account information input" screen E (refer to FIG. 11) in the display section 103. Then, the customer inputs information relating to the second account at the other financial institution, and depresses the "register" button in a similar manner to that described above.

At step S11, the other-financial-institution account register control section 101B recognizes the information (the financial institution name, the branch number, the type of account, the account number, and the code number) relating to the input second account. Then, the process proceeds to step S9. At step S9, the other-financial-institution account register control section 101B displays the "confirm" button not shown in the display section 103, and makes a decision about whether this "confirm" button has been depressed or not. When the customer has depressed this "confirm" button, the other-financial-institution account register control section 101B sets "Yes" as a result of the decision made at step S9, and then the process proceeds to step S12.

At step S12, the other-financial-institution account register control section 101B delivers the information of the account number relating to the first master account and the information of the account number relating to the second account input at step S10, to the communication control section 102. Then, the communication control section 102 makes access to the host terminal 200 via the LAN 400, the WAN 500, and the LAN 600, obtains the information of the account names (names) of the respective accounts at the other financial institutions from the customer information database DB, and delivers all the information to the other-financial-institution account register control section 101B.

At step S13, the other-financial-institution account register control section 101B makes a decision about whether the two account names at the other financial institutions obtained coincide with each other or not. When a result of the decision made is "No", it is not possible to register the account, and the process returns to step S1.

On the other hand, when a result of the decision made at step S13 is "Yes", the other-financial-institution account register control section 101B proceeds to step S14, and displays the "registered list of transactable accounts" screen F shown in FIG. 12 in the display section 103. In this case, as the plurality of accounts at the other financial institutions are registered, the name of the financial institution for the No. 1 account and the name of the financial institution for the No. 2 account shown in FIG. 12 are different in actual practice. The customer confirms the information relating to a plurality of (in this case, two) accounts to be registered at the other financial institutions, based on the above screen, and then depresses the "confirm" button shown in the drawing. Then, the other-financial-institution account register control section 101B proceeds to step S15, displays the "code number for a plurality of accounts registration menu" screen G shown in FIG. 13 in the display section 103 in a similar manner to that explained above. Then, the process proceeds to step S16.

At step S16, the other-financial-institution account register control section 101B makes a decision about whether the "register" button of the "code number for a plurality of accounts registration menu" screen G has been depressed or not. When a result of this decision is "Yes", the other-financial-institution account register control section 101B proceeds to step S17. At step S17, the other-financial-institution account register control section 101B displays the "code number for a plurality of accounts input" screen H shown in FIG. 14 in the display section 103. Then, the customer inputs a four-digit code number from the "input button", and depresses the "register" button.

At step S18, the other-financial-institution account register control section 101B makes a decision about whether it is possible to write data relating to the information of a plurality of accounts into the magnetic card 700 (refer to FIG. 3) (or the IC card 800 (refer to FIG. 4)) or not.

When the magnetic card 700 has been inserted into the magnetic card reader/writer 105, and also when the "last registered account No." in the management header information JM0 shown in FIG. 3 is 0, the other-financial-institution account register control section 101B sets "Yes" as a result of the decision made at step S18. Then, the process proceeds to step S19. At step S19, the other-financial-institution account register control section 101B delivers the information relating to the two accounts at the other financial institutions to be registered into the magnetic stripe 702 of the magnetic card 700, to the magnetic card read/write control section 101D.

Then, the magnetic card read/write control section 101D write-controls the magnetic card reader/writer 105, thereby to write each information into the management header information JM0, the master account information JM1, and the account information JM2 of the magnetic stripe 702 of the magnetic card 700. Then the process returns to step S1. Based on this, 2 is recorded as the "last registered account No.", and the information of the code number input at step S17 is recorded as the "code number for registering a plurality of accounts", in the recording area of the management header information JM0 shown in FIG. 3. Further, the master account and the second account input at step S11 are recorded into the recording areas of the master account information JM1 and the account information JM2 respectively.

When the IC card 800 has been inserted into the IC card reader/writer 106, and also when the "last registered account No." in the management header information JI0 shown in FIG. 4 is 0, the other-financial-institution account register control section 101B sets "Yes" as a result of the decision made at step S18. Then, the process proceeds to step S19. At step S19, the other-financial-institution account register control section 101B delivers the information relating to the two accounts at the other financial institutions to be registered into the IC 802 of the IC card 800, to the IC card read/write control section 101E.

Then, the IC card read/write control section 101E write-controls the IC card reader/writer 106, thereby to write each information into the management header information JI0, the master account information JI1, and the account information JI2 of the IC 802 of the IC card 800 in a similar manner to that of the magnetic card 700. Then, the process returns to step S1.

On the other hand, when a result of the decision made at step S18 is "No", the other-financial-institution account register control section 101B issues an access request to the communication control section 102 to the host terminal 200. Then, at step S20, the communication control section 102 makes access to the host terminal 200 in a similar manner to that explained above, and sets 1 to the "transaction valid/invalid flag" in the "attribute information of a plurality of account transactions" JD0 shown in FIG. 5. At the next step S21, the other-financial-institution account register control section 101B delivers the information relating to the two accounts at the other financial institutions to be registered into the customer information database DB, to the communication control section 102. Then, the communication control section 102 makes access to the host terminal 200, and writes each information to the "attribute information of a plurality of account transactions" JD0, the master account information JD1, and the account information JD2 shown in FIG. 5, in a similar manner to that explained above. Then, the process returns to step S1. Based on this, the magnetic card is recorded as the "recording medium information", 2 is recorded as the "last registered account No.", and the information of the code number input at step S17 is recorded as the "code number for registering a plurality of accounts", in the recording area of the "attribute information of a plurality of account transactions" JD0 shown in FIG. 5. Further, the information relating to the master account and the information relating to the second account input at step S11 are recorded into the recording areas of the master account information JD1 and the account information JD2 respectively.

As explained above, when the registration of the accounts at the other financial institutions has been selected at step S6, the information of the plurality of accounts at the other financial institutions is registered into the magnetic card 700 (the magnetic stripe 702), the IC card 800 (the IC 802), or the customer information database DB, respectively. The code number for a plurality of accounts is also registered when necessary.

When the registration of a plurality of accounts at the same financial institution (or other financial institutions) has been completed through the above operation, transactions are carried out using one cash card (the magnetic card 700 or the IC card 800). Specifically, when the magnetic card 700 is used as the cash card and this has been inserted into the magnetic card reader/writer 105, the display section 103 displays the transaction initial screen A shown in FIG. 7. Then, the customer depresses the "withdraw" button, for example. The touch panel 104 detects this depression, and the transaction operation control section 101 displays the menu screen (not shown) for inputting the "code number for registering a plurality of accounts" shown in FIG. 3 in the display section 103.

The customer inputs the code number for a plurality of accounts according to the menu screen. Then, the transaction operation control section 101 reads the registered "code number for registering a plurality of accounts" shown in FIG. 3 via the magnetic card reader/writer 105 and the magnetic card read/write control section 101D. Next, the transaction operation control section 101 collates the read "code number for registering a plurality of accounts" with the code number for a plurality of accounts input by the customer, and makes a decision about whether both code numbers coincide with each other.

When both code numbers coincide with each other, the transaction operation control section 101 decides that the customer is a legal user. Then, the transaction operation control section 101 displays in the display section 103 a menu screen for selecting which one of the accounts shown in the master account information JM1 and the account information JM2 shown in FIG. 3 is to be transacted. A transaction of the account is carried out based on a result of this selection.

On the other hand, when the two code numbers do not coincide with each other, the transaction operation control section 101 displays the screen menu for inputting the code number for a plurality of accounts again in the display section 103, and collates the financial institution input by the customer with the "code number for registering a plurality of accounts" shown in FIG. 3. When the two code numbers do not coincide with each other after carrying out the collation three times, for example, the transaction operation control section 101 decides that the customer is an illegal user, and makes it impossible to use the cash card (the magnetic card 700 in this case).

Next, the operation in the case of the automatic registration in place of the manual registration will be explained. In this case, it is assumed that the "registration method selection" screen B (refer to FIG. 8) has been displayed in the display section 103. In this state, at step S4, the transaction operation control section 101 makes a decision about whether the "insert a registration card (automatic registration)" button or the "input on the screen (manual registration)" button has been depressed on the "registration method selection" screen B.

After the customer has depressed the "insert a registration card (automatic registration)" button, a plurality of registration cards are sequentially inserted into the magnetic card reader/writer 105 or the IC card reader/writer 106. Then, the transaction operation control section 101 proceeds to step S12. The above plurality of registration cards are the cards recorded with the account information (the master account information JM1 (the master account information JI1) relating to a plurality of accounts to be registered and the account information JM2 (the account information JI2)) respectively. Each account information on the plurality of registration cards is read by the magnetic card reader/writer 105 or the IC card reader/writer 106.

When the information of the plurality of accounts based on the registration cards is the information relating to a plurality of accounts at the same financial institution, the same-financial-institution account register control section 101A executes the process at steps S12 to step S21. As a result, the information of the plurality of accounts at the same financial institution is recorded onto the cash card (the magnetic card 700 or the IC card 800) or the customer information database DB.

When the information of the plurality of accounts based on the registration cards is the information relating to a plurality of accounts at other financial institutions, the other-financial-institution account register control section 101B executes the process at steps S12 to step S21. As a result, the information of the plurality of accounts at the other financial institutions is recorded onto the cash card (the magnetic card 700 or the IC card 800) or the customer information database DB.

Next, the operation of deleting desired account information from information of a plurality of accounts registered in the cash card (the magnetic card 700 or the IC card 800) or the customer information database DB will be explained.

Figure 15:
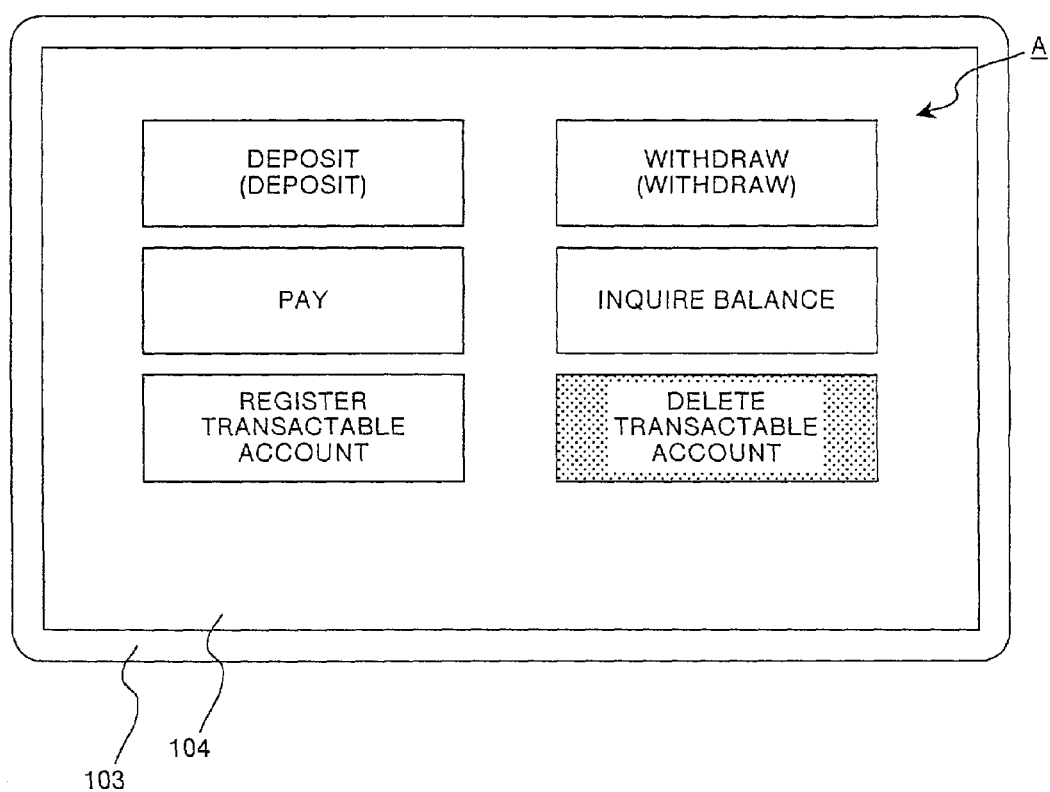
FIG. 15 is a diagram showing a "transaction initial" screen A in the automatic teller machine according to one embodiment.

When the magnetic card 700 recorded with information of a plurality of accounts has been inserted into the magnetic card reader/writer 105 (or when the IC card 800 recorded with information of a plurality of accounts has been inserted into the IC card reader/writer 106) of the automatic teller machine 100 shown in FIG. 2, the transaction operation control section 101 displays the transaction initial screen A shown in FIG. 15 in the display section 103, at step S1 shown in FIG. 6. Then, the process proceeds to step S2. The display section 103 displays the menu buttons for selecting a plurality of transactions including the "deposit", the "withdraw", the "pay", the "inquire balance", the "register a transactable account", and the "delete a transactable account".

At step S2, the transaction operation control section 101 makes a decision about whether the "register a transactable account" button or the "delete a transactable account" button has been depressed on the "transaction initial" screen A. When the customer has depressed the "register a transactable account" button, the touch panel 104 detects the depressing of this button.

At step S22, the account delete control section 101C controls the magnetic card read/write control section 101D (or the IC card read/write control section 101E) to read the information of the plurality of accounts registered in the magnetic card 700 (or the IC card 800). Further, the account delete control section 101C controls the communication control section 102 to make access to the customer information database DB. Thus, the account delete control section 101C reads the account information relating to the customer when this account information exists, in addition to the information of the plurality of accounts registered in the magnetic card 700 (or the IC card 800), from the customer information database DB.

Next, the account delete control section 101C displays the "account delete" screen I shown in FIG. 16 that includes the "registered list of transactable accounts" consisting of the read information of a plurality of accounts, in the display section 103. Then, the display section 103 displays the "registered list of transactable accounts", a registered account No. of an item to be deleted, a "code number" of the account to be deleted, an "input button" for inputting the registered account No. and the code number, a "confirm" button, and a "cancel" button.

The customer inputs a registered account number (No.) to be deleted from the "registered list of transactable accounts" with the "input button". However, it is not possible to delete the master account having the registered account number (No.) as 1. When the customer has input 2 as a registered account number (No.) to be deleted, and also input a four-digit number as the "code number" of this account, from the "input button" respectively, the account delete control section 101C recognizes the input information at step S23. Then, the process proceeds to step S24. At step S24, the account delete control section 101C makes a decision about whether the "confirm" button shown in FIG. 16 has been depressed or not. When a result of this decision is "No", the process returns to step S1.

When the "confirm" button has been depressed, the account delete control section 101C sets "Yes" as a result of the decision made at step S24. Then, the process proceeds to step S25. At step S25, the account delete control section 101C makes a decision about whether the registered account data to be deleted assigned by the customer at step S23 has been registered in the magnetic card 700 or the IC card 800.

In this case, it is assumed that the registered account data to be deleted has been registered in the magnetic card 700 (or the IC card 800). The account delete control section 101C sets "Yes" as a result of the decision made at step S25. Then, the process proceeds to step S26. At step S26, the account delete control section 101C controls the magnetic card read/write control section 101D (or the IC card read/write control section 101E), thereby to delete the registered account data to be deleted registered in the magnetic card 700 (or the IC card 800). Then, the process proceeds to step S27.

Figure 17:
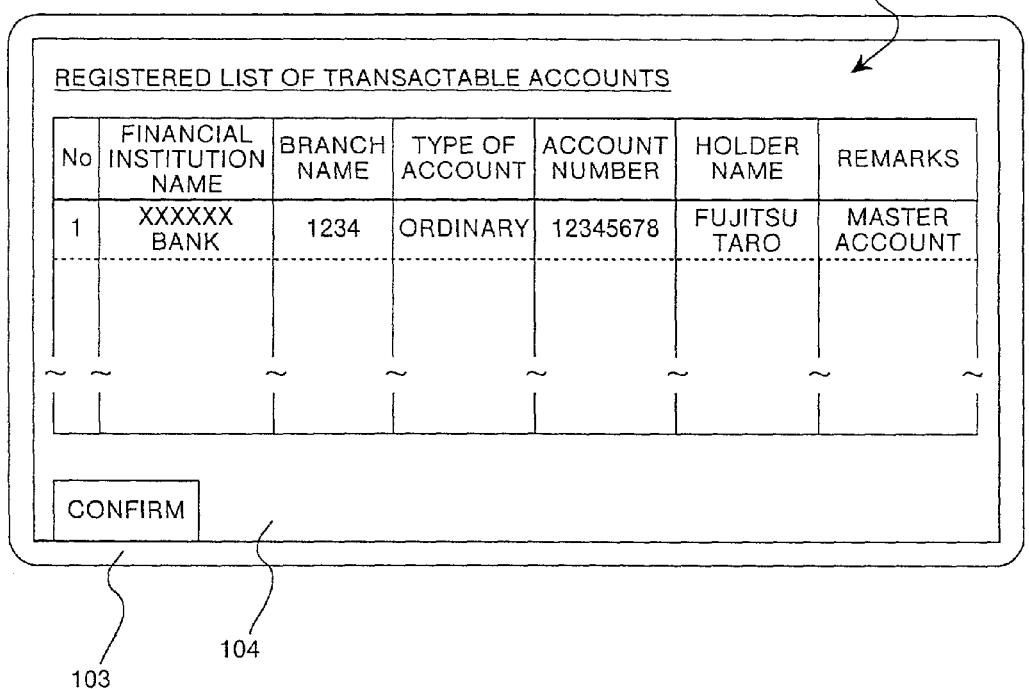
FIG. 17 is a diagram showing an "account delete confirmation" screen J in the automatic teller machine according to one embodiment.

At step S27, the account delete control section 101C displays in the display section 103 an "account delete confirmation" screen J (refer to FIG. 17) for confirming that the information of the account has been deleted from the "registered list of transactable accounts" shown in FIG. 16. Then, the customer depresses the "confirm" button, and the process returns to step S1. Based on this, the customer can recognize that the account information having 2 as the registered account number has been deleted, through a visual confirmation of the "account delete confirmation" screen J.

On the other hand, when a result of the decision made at step S25 is "No", that is, when the registered account information to be deleted has been registered in the customer information database DB, the account delete control section 101C proceeds to step S28. At step S28, the account delete control section 101C controls the communication control section 102, thereby to make access to the customer information database DB. The account delete control section 101C deletes the data of the account from the customer information database DB. Then, the process proceeds to step S29. At step S29, the account delete control section 101C makes a decision about whether or not registered information of a plurality of accounts exists in the customer information database DB after the deletion. When a result of the decision made is "No", the process proceeds to step S30.

At step S30, the account delete control section 101C sets 0 to the "transaction valid/invalid flag" in the customer information database DB, thereby to make invalid the transaction of a plurality of accounts. Then, the process proceeds to step S27. At step S27, as explained above, the account delete control section 101C displays in the display section 103 the "account delete confirmation" screen J (refer to FIG. 17) for confirming that the information of the account has been deleted from the "registered list of transactable accounts" shown in FIG. 16. Then, the customer depresses the "confirm" button, and the process returns to step S1. On the other hand, when a result of the decision made at step S29 is "Yes", the account delete control section 101C proceeds to step S27, and displays the "account delete confirmation" screen J. Then, the process returns to step S1.

As explained above, according to the above embodiment, the same-financial-institution account register control section 101A is provided, and it is possible to register information of a plurality of accounts at the same financial institution into one cash card (the magnetic card 700 or the IC card 800), or the customer information database DB, based on the operation of the customer. As a result, the convenience improves.

Further, according to the above embodiment, the other-financial-institution account register control section 101B is provided, and it is possible to register information of a plurality of accounts at other financial institutions, not only information of a plurality of accounts at the same financial institution, into one cash card (the magnetic card 700 or the IC card 800). As a result, the convenience improves further, and the quality of services to customers also improves.

Further, according to the above embodiment, the account delete control section 101C is provided, and it is possible to delete account information assigned by the customer from registered information of a plurality of accounts, in addition to the above-described registration. As a result, the convenience improves further.

Further, according to the above embodiment, account information is registered into the customer information database DB even when the recording capacity of the cash card (the magnetic card 700 or the IC card 800) is in shortage. As a result, even when there is a very large amount of account information to be registered, the convenience of being able to register into one cash card is not lost.

Further, according to the above embodiment, separately from a code number for each account, a code number for registering a plurality of accounts common to the plurality of accounts is registered into a cash card (the magnetic card 700 or the IC card 800), or the customer information database DB. As a result, the securing improves.

While one embodiment of the present invention has been explained in detail with reference to the drawings, the detailed structure examples are not limited to the above embodiment. Any other design modification within the range not deviating from the gist of the present invention is included in the present invention. For example, in the above embodiment, an example of inputting account information relating to a master account at the time of manually registering a plurality of accounts has been explained. However, when the account information relating to the master account has been registered in advance in a cash card (the magnetic card 700 or the IC card 800), it is not necessary to input the account information relating to this master account.

As explained above, according to the present invention, a customer can register information of a plurality of accounts to be registered into one cash card. As a result, the convenience improves.

Further, according to the present invention, it is possible to register information of a plurality of accounts at other financial institutions as well as information of a plurality of accounts at the same financial institution, into one cash card. As a result, there is an effect that the convenience improves further. The quality of services to customers also improves.

Further, according to the present invention, delete control unit is provided. Therefore, a customer can delete account information as well as register account information. As a result, there is an effect that the convenience improves further.

Further, according to the present invention, when all information of a plurality of accounts cannot be registered into a cash card, register control unit can register the account information that cannot be registered, into storage unit. As a result, there is an effect that the convenience of being able to register into one cash card is not lost even when there is a very large amount of account information to be registered.

Further, according to the present invention, when a customer has input account information to be deleted from a menu screen, the delete control unit deletes the account information assigned by the customer from information of a plurality of accounts that has been registered in a cash card or the storage unit. Therefore, the deletion of account information can be done at the customer side. As a result, there is an effect that the convenience improves.

Further, according to the present invention, code number for a plurality of accounts that is common to a plurality of accounts is registered, and a transaction is carried out based on this code number for a plurality of accounts. As a result, there is an effect that the security improves.

Further, according to the present invention, when a customer has input account information to be deleted from a menu screen, the delete control unit deletes the account information assigned by the customer from information of a plurality of accounts that has been registered in a cash card. Therefore, the deletion of account information can be done at the customer side. As a result, there is an effect that the convenience improves.

INDUSTRIAL APPLICABILITY

As explained above, the automatic teller machine relating to the present invention is useful for carrying out a transaction at a financial institution using cash card.

The invention claimed is:

1. An automatic teller machine capable of writing account information on a cash card, comprising:
   at least one cash card reader/writer;
   a display control unit to display a menu screen enabling a customer to select one of a writing operation and a deleting operation for the account information written on a cash card and to input first information for at least one account to be written on a cash card;
   a storage unit that stores second information, the second information including third information for at least one account of the customer;
   a write control unit that obtains the third information corresponding to the first information and writes the first information into the cash card when the writing operation is selected using said display control unit and the first information coincides with the third information; and
   a transaction unit that carries out transactions, the transactions including at least one of depositing, withdrawing, payment, and balance inquiry, based on the first information written on the cash card.

2. The automatic teller machine according to claim 1, further comprising a delete control unit that makes said display control unit cause a deletion menu screen to be displayed for enabling a customer to select and input fourth information to be deleted from the account information written on the cash card, and deletes from the cash card the account information identified by the fourth information, in response to a selection by the customer.

3. The automatic teller machine according to claim 1, wherein when it is not possible to write all the account information for a plurality of accounts on the cash card, said write control unit writes the account information that cannot be written on the cash card, into said storage unit.

4. The automatic teller machine according to claim 3, further comprising a delete control unit that makes said display control unit cause a deletion menu screen to be displayed for enabling a customer to input fourth information to be deleted from the account information in one of the cash card and said storage unit, and deletes the account information in the one of the cash card and said storage unit in response to a selection by the customer.

5. The automatic teller machine according to claim 1, further comprising a code number register unit that writes a code number that is common to a plurality of accounts, into the cash card, and
   wherein said transaction unit carries out the transactions only when the code number for the plurality of accounts coincides with an input number provided by the customer when the transactions are requested.

6. An automatic teller machine capable of writing and deleting account information on a cash card, comprising:
   at least one cash card reader/writer;
   an input unit having a menu screen to display operation menus of a writing operation and a deleting operation for the account information written on the cash card, and an operation input part to receive a selection of an operation from the menus and first information related to one of the writing operation and the deleting operation;
   a storage unit that stores second information, the second information including third information on at least one account of the customer;
   a delete control unit that carries out the deleting operation for the account information written on the cash card based on the first information when the deleting operation is selected using said input unit;
   a write control unit that obtains from said storage unit the third information corresponding to the first information from said input unit and carries out the writing operation to write the first information into the cash card when the first information coincides with the third information; and
   a transaction unit that carries out transactions, the transactions including at least one of depositing, withdrawing, payment, and balance inquiry based on the first information written into the cash card.

7. The automatic teller machine according to claim 6, wherein when it is not possible to write all the account information for a plurality of accounts on the cash card, said write control unit writes the account information that cannot be written on the cash card, into said storage unit.

8. The automatic teller machine according to claim 7, wherein said delete control unit makes said input unit display a menu enabling a customer to input the first information to be deleted from the account information written in one of the cash card and said storage unit, and deletes the account information in the one of the cash card and said storage unit.

9. The automatic teller machine according to claim 6,
   further comprising a code number register unit that writes a code number that is common to a plurality of accounts, into the cash card, and
   wherein said transaction unit carries out the transactions only when the code number for the plurality of accounts coincides with an input number provided by the customer when the transactions are requested.

10. An automatic teller machine associated with a display unit and capable of writing and deleting account information on a cash card and carrying out transactions including at least one of depositing, withdrawing, payment, and balance inquiry based on first information on at least one account written into a cash card, the automatic teller machine comprising:
    at least one cash card reader/writer;
    a delete control unit that makes the display unit display a menu screen enabling a customer to select and input account information to be deleted out of the first information written into the cash card, and deletes the account information on the cash card in response to a selection by the customer.

11. The automatic teller machine according to claim 1, wherein the cash card is one of a magnetic card and an integrated circuit card.

12. The automatic teller machine according to claim 6, wherein the cash card is one of a magnetic card and an integrated circuit card.

13. An automatic teller machine capable of writing and deleting information on financial accounts on a cash card, comprising:
    at least one cash card reader/writer;
    an input unit having a menu screen including operation menus of a writing operation and a deleting operation for account information written on the cash card, and an operation input part to receive a selected one of the writing operation and the deleting operation;
    a writing and deleting control unit that carries out the selected one of the writing operation and the deleting operation for the account information written on the cash card; and a transaction unit carrying out a transaction on one of the financial accounts related to the account information written on the cash card.

14. An automatic teller machine as recited in claim 13, wherein the plurality of financial accounts are from at least two different financial institutions.

15. An automatic teller machine, comprising:

at least one cash card reader/writer;

a display control unit that controls a display on a menu screen enabling a customer to input first information of a plurality of accounts to be written into a cash card;

a storage unit that stores second information, the second information including third information of a plurality of accounts of the customer;

a write control unit that obtains the third information corresponding to the first information and writes the first information into the cash card when the first information coincides with the third information; and a transaction unit that carries out transactions, the transactions including at least one of depositing, withdrawing, payment, and balance inquiry, based on the first information written into the cash card.

\* \* \* \* \*